United States Patent
Li et al.

(10) Patent No.: US 10,138,331 B2
(45) Date of Patent: Nov. 27, 2018

(54) MATRIX-FREE POLYMER NANOCOMPOSITES AND RELATED PRODUCTS AND METHODS THEREOF

(71) Applicant: RENSSELAER POLYTECHNIC INSTITUTE, Troy, NY (US)

(72) Inventors: Ying Li, Xiangtan (CN); Linda S. Schadler Feist, Niskayuna, NY (US); Chaitanya Ullal, Troy, NY (US); Charles S. S. Goodwin, Latham, NY (US); Robert F. Karlicek, Jr., Mechanicville, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 15/305,767

(22) PCT Filed: Apr. 24, 2015

(86) PCT No.: PCT/US2015/027573
§ 371 (c)(1),
(2) Date: Oct. 21, 2016

(87) PCT Pub. No.: WO2015/164779
PCT Pub. Date: Oct. 29, 2015

(65) Prior Publication Data
US 2017/0044327 A1    Feb. 16, 2017

Related U.S. Application Data

(60) Provisional application No. 61/983,591, filed on Apr. 24, 2014.

(51) Int. Cl.
*C08G 79/02*     (2016.01)
*C08G 83/00*     (2006.01)
*C08L 83/08*     (2006.01)

(52) U.S. Cl.
CPC ......... *C08G 83/001* (2013.01); *C08G 79/02* (2013.01); *C08L 83/08* (2013.01)

(58) Field of Classification Search
None
See application file for complete search history.

(56) References Cited

U.S. PATENT DOCUMENTS 7,311,943 B2 * 12/2007 Jacobson ............... B05D 1/185
                                                        427/258
8,206,747 B2 *  6/2012 Zale ........................ A61K 9/10
                                                        424/489

(Continued)

FOREIGN PATENT DOCUMENTS

WO     2011013637 A1    2/2011
WO     2012169237 A1   12/2012

(Continued)

OTHER PUBLICATIONS

Supporting information for Dach et al. Macromolecules, 2010, 43, 6549-6552, 5 pages (Year: 2010).*

(Continued)

*Primary Examiner* — Robert S Loewe
(74) *Attorney, Agent, or Firm* — Heslin Rothenberg Farley & Mesiti P.C.

(57) ABSTRACT

The present disclosure relates to a matrix-free polymer nanocomposite. The matrix-free polymer nanocomposite includes a plurality of polymer brush grafted nanoparticles, which form the nanocomposite in the absence of a polymeric matrix. The polymer brush grafted to the nanoparticles comprises a multimodal brush configuration having at least two different populations of polymer ligands of different lengths. The present disclosure also relates to an optic or optoelectronic component comprising a matrix-free polymer nanocomposite as described herein. The present disclosure (Continued)

further relates to a method of making a matrix-free polymer nanocomposite.

20 Claims, 20 Drawing Sheets

(56) References Cited

U.S. PATENT DOCUMENTS

| | | | |
|---|---|---|---|
| 2007/0112101 A1* | 5/2007 | Choi | C08L 63/00 523/442 |
| 2008/0081074 A1* | 4/2008 | Gu | A61K 9/5153 424/489 |
| 2009/0061010 A1* | 3/2009 | Zale | A61K 9/5153 424/501 |
| 2010/0261808 A1* | 10/2010 | Schadler | B82Y 30/00 523/205 |
| 2011/0061891 A1* | 3/2011 | Schadler | B82Y 30/00 174/110 SR |
| 2012/0039824 A1* | 2/2012 | Archer | A61K 9/5192 424/59 |
| 2012/0071680 A1 | 3/2012 | Tokumitsu | |
| 2012/0264881 A1* | 10/2012 | Lancaster | C08F 2/38 525/193 |
| 2013/0041112 A1* | 2/2013 | Benicewicz | C08F 292/00 525/342 |
| 2013/0045897 A1* | 2/2013 | Chakraborty | B82Y 30/00 507/117 |
| 2010/3021101 | 8/2013 | Otsuka et al. | |
| 2013/0211016 A1 | 8/2013 | Otsuka et al. | |
| 2014/0213641 A1* | 7/2014 | Borros Gomez | A61K 9/0019 514/449 |

FOREIGN PATENT DOCUMENTS

| | | |
|---|---|---|
| WO | 2013078309 A1 | 5/2013 |
| WO | 2014165516 A1 | 10/2014 |

OTHER PUBLICATIONS

International Search Report and Written Opinion issued in PCT/US2015/027573, dated Sep. 8, 2015.

Dach et al., "Cross-Linked "Matrix-Free" Nanocomposites from Reactive Polymer-Silica Hybrid Nanoparticles," Macromolecules,43:6549-6552 (2010).

Li et al., "Ligand Enginering of Polymer Nanocomposites: From the Simple to the Complex," ACS Applied Materials & Interfaces, 6:6005-6021 (Jan. 29, 2014).

Li at al., "Bimodal "matrix-free" polymer nanocomposites," RSC Advances, 5:14788-14795 (2015).

Extended European Search Report issued in EP Application No. 15783771.7 (PCT/US2015/027573), dated Nov. 13, 2017, 8 pages.

* cited by examiner

MATRIX-FREE POLYMER NANOCOMPOSITES AND RELATED PRODUCTS AND METHODS THEREOF

CROSS-REFERENCE TO RELATED APPLICATIONS

This is the National Phase filing under 35 U.S.C. § 371 of International Application No. PCT/US2015/027573, filed Apr. 24, 2015, and published as WO2015/164779 A1 on Oct. 29, 2015, which claims priority benefit of U.S. Provisional Patent Application Ser. No. 61/983,591, filed Apr. 24, 2014. The contents of each of the prior applications are hereby incorporated by reference herein in their entirety.

GOVERNMENT RIGHTS STATEMENT

This invention was made with Government support under grant number EEC-0812056 awarded by the National Science Foundation and grant number DMR-0642576 awarded by the National Science Foundation. The United States Government has certain rights in the invention.

FIELD OF THE INVENTION

The present invention generally relates to, inter alia, matrix-free polymer nanocomposites, as well as to various products containing the disclosed matrix-free polymer nanocomposites and methods of making and using the disclosed matrix-free polymer nanocomposites.

BACKGROUND OF THE INVENTION

Conventional polymer nanocomposites consist of: (1) inorganic nanofiller as a property/performance booster; (2) a polymeric matrix providing processability and holding the reinforcements together into a solid; and (3) surface ligands to control nanofiller dispersion, essential to delivering the promised performance enhancement (see Scheme 1 (FIG. 11)).[1-3] To obtain greater property reinforcement, a large volume fraction of nanofiller ($v_{filler}$) is often desired, especially for optical nanocomposites.[4,5] However, the probability for macro-phase separation tends to be larger at higher volume fraction. To maximize nanoparticle loading while maintaining uniform particle dispersion, $v_{matrix}$ should be zero.

To achieve the maximum optoelectronic property enhancement of polymer nanocomposites, very high nanofiller loading fractions is often desired. For traditional polymer nanocomposites, where inorganic nanofillers with superior optoelectronic properties (e.g. high refractive index) are strongly incompatible with polymeric matrices, obtaining well-controlled nanofiller dispersion at high loading fractions is very challenging, which compromises the promised property enhancement of the nanocomposites. Current technology solutions involve the use of capping agents to stabilize nanofiller dispersion and suppress macroscopic phase separation between capped nanofiller and matrix polymer, which, however, take up significant volume fractions. It is even more challenging when precise control of nanofiller distribution or concentration gradient is required and/or multiple functionalities need to be incorporated into the nanocomposites.

An analogous matrix-free system is the so-called organic/inorganic "solvent-free nanofluid", whose fluidity is suited for applications in heat-transfer fluids, lubricants, and liquid electrolytes.[6-10] Solid-state polymer nanocomposites, on the other hand, require a higher level of structural integrity. Tchoul et al. first demonstrated a mechanically robust matrix-free assembly of inorganic nanoparticles surface grafted with thermoplastic polymer brushes.[11] Polymer brush chain interpenetration and entanglement, which occurs only above a critical molecular weight for entanglement,[12] serves as physical cross-links to ensure good mechanical properties.[13]

Alternatively, in the absence of entanglements, mechanical integrity can be provided by chemical cross-linking, which is especially important for thermoset polymer nanocomposites with a $T_g$ below room temperature. A low $T_g$ brush can be useful for promoting flow and moldability, while setting the meso- or macroscopic assemblies of grafted nanoparticles into desired architectures can be enabled by cross-linkable brush polymers. Using two kinds of complementary reactive polymer brush grafted $SiO_2$ nanoparticles, Dach et al. synthesized chemically cross-linked "matrix-free" nanocomposites.[14] However, the reported shear moduli of the cross-linked nanocomposites were low, due to incomplete network formation between the two immiscible polymer brushes. A suggested solution is to use the same crosslinkable moiety for all the $SiO_2$ particles. The van der Waals (vdW) core-core attraction between high refractive index metal oxide (e.g. $TiO_2$ or $ZrO_2$) nanoparticles within a polydimethylsiloxane (PDMS) matrix is often much higher than the thermal fluctuations at room temperature (5 to 10 $k_BT$), which encourages particle core —core agglomeration.[15-18] Intuition suggests that a densely grafted long chain polymer brush would screen this core-core attraction and also enable entanglement. However, achieving both high graft density and high molecular weight of a polymer brush is not only experimentally challenging but reduces the achievable $v_{filler}$.

The present invention is directed to overcoming these and other deficiencies in the art.

SUMMARY OF THE INVENTION

The present invention generally relates to, inter alia, matrix-free polymer nanocomposites, as well as to various products containing the disclosed matrix-free polymer nanocomposites and methods of making and using the disclosed matrix-free polymer nanocomposites.

In one aspect, the present disclosure provides a matrix-free polymer nanocomposite. The matrix-free polymer nanocomposite includes a plurality of polymer brush grafted nanoparticles, which form the nanocomposite in the absence of a polymeric matrix. The polymer brush grafted to the nanoparticles comprises a multimodal brush configuration having at least two different populations of polymer ligands of different lengths.

In another aspect, the present disclosure provides an optic or optoelectronic component comprising a matrix-free polymer nanocomposite as described herein. In one embodiment, the matrix-free polymer nanocomposite of the optic or optoelectronic component includes a plurality of polymer brush grafted nanoparticles, which form the nanocomposite in the absence of a polymeric matrix. The polymer brush grafted to the nanoparticles comprises a multimodal brush configuration having at least two different populations of polymer ligands of different lengths.

In a further aspect, the present disclosure provides a method of making a matrix-free polymer nanocomposite. This method includes the steps of: (i) providing a plurality of nanoparticles of a same chemical nature; and (ii) grafting a multimodal polymer brush onto the plurality of nanoparticles to yield a plurality of polymer brush grafted nanoparticles forming a nanocomposite in the absence of a polymeric matrix. The multimodal polymer brush comprises at least a first polymer ligand and a second polymer ligand of different.

The present disclosure provides, inter alia, a unique solution for maximizing nanofiller volume fractions while maintaining precise control of nanoparticle dispersion and distribution. In addition, various functionalities for optoelectronic applications can be integrated into the nanocomposites without sacrificing good dispersion and optical transparency. In this case, surface grafted polymer brushes act as both matrix material, and stabilizing agent. Without the presence of the matrix phase, macro-phase separation is effectively prevented since there is only one component in the "matrix-free" nanocomposite system, provided that the ligands are chemically bound to the nanoparticle surface.

Bidispersity or polydispersity of surface grafted polymer brushes has been used recently to promote metal oxide nanoparticle dispersion in high molecular weight polymers.[19-22] A high graft density short brush encourages enthalpic screening and the long low graft density brushes encourage entropy-driven mixing of the matrix long brush chains.[15, 17, 23, 24] As provided in the present disclosure, for "matrix-free" polymer nanocomposites where filler dispersal is no longer relevant, the polydispersity of the grafted brush is still useful, providing core repulsion and brush entanglement at low brush volume. Since monomer crowding near the particle surface determines the shielding of core-core attraction,[25] it is reasonable and necessary to decrease crowding of long brush chains farther from the particle surface to allow entanglement while reducing the total brush volume fraction, $v_{surface\ ligand}$.

For illustration purposes, in accordance with aspects of the present disclosure, high-refractive-index zirconia ($ZrO_2$) nanoparticle and polydimethylsiloxane (PDMS) polymer were used as an example to demonstrate the design, preparation, and optoelectronic applications of cross-linkable "matrix-free" nanocomposites. The commercial PDMS polymers were modified such that one end of the polymer chain serves as a robust anchor on the nanoparticle surfaces (polymer brush configuration) while the other end of the polymer brush chain are cross-linkable under different conditions designed according to specific applications, such as heat, UV, etc. Since the PDMS brush polymer can be cross-linked, there is no need to add PDMS matrix polymer, which inevitability dilutes the $ZrO2$ nanoparticle volume fractions, as in traditional polymer nanocomposites. Meanwhile, since the brush polymers are chemically bound onto nanoparticles, macroscopic phase separations plagued the traditional polymer nanocomposites can be effectively suppressed. In a cross-linkable "matrix-free" nanocomposite, the nanoparticle volume fractions and processability can be tailored by varying the surface ligand system design (i.e., graft density, brush polymer length, polydispersity). The multimodal surface ligand system design also gives rise to a precise control of nanoparticle concentration distribution. In addition, with a highly integrated material platform created in this invention, the nanoparticles can be used as a carrier for various functionalities including color conversion and environmentally responsiveness. While in traditional polymer nanocomposites, the incorporation of additional functionalities often introduce more complex nanofiller dispersion problems.

Traditional polymer nanocomposites consist of nanofillers or nanoparticles, which provide various property enhancements, dispersed in polymeric matrices, which provide mechanical integrity, flexibility, and processability of the nanocomposites. The present disclosure eliminates the use of matrix polymer and the need of nanofiller dispersal. Compared to few reported matrix-free nanocomposites (e.g., cross-linked matrix-free nanocomposites constructed from immiscible complementary nanoparticles clicked together like Legos), in certain embodiments, the nanocomposites of the present disclosure are built from nanoparticles of the same chemical nature, and various macro-, micro- or nano-structured assemblies can be easily obtained using molding, 3D printing, and soft imprint lithography. In addition, instead of using different carriers for different functionalities, the present disclosure uniquely integrates various functionalities into the nanocomposite network using a single material platform of multimodal polymer brush design.

The cross-linkable matrix-free nanocomposite created in accordance with the present disclosure offers maximum tunable nanoparticle loading range without inducing macroscopic phase separation. Since there is no matrix polymer addition, nanocomposite processing is largely simplified. The cross-linkable nanocomposite with superior wetting behavior can be molded into various nanostructures, which can subsequently be cured using heat or photon excitation depending on the particular applications. By tailoring the highly integrated surface ligand system of the nanoparticles, their concentration distribution and additional functionalities can be precisely controlled.

The present disclosure has wide applications in high-refractive-index LED encapsulants; graded refractive index optical elements; waveguide optics; panel lighting systems; inks for high-resolution laser write lithography, 3D printing, and stamping using soft lithography; thermally conducting fluid with superior wettability, etc.

As provided by the present disclosure, the successful synthesis of the cross-linkable polymer brush has been verified using FTIR, GPC, $^{31}P$ NMR, $^{1H}$ NMR, the attachment of the cross-linkable polymer brush onto nanoparticles has been confirmed using TGA, FTIR, $^{1H}$ NMR. The refractive index and optical transparency of the nanocomposites before cross-linking have been measured by spectroscopic ellipsometer and UV/vis/NIR spectrophotometer, respectively. The cross-linking reaction has been monitored using rheometrics mechanical spectrometer. A prototype of cross-linked matrix-free $ZrO_2$/PDMS nanocomposites with high refractive index and optical transparency has been prepared. To demonstrate the practically application of this invention in LED lighting, carefully designed PTFE molds have been used to mold the nanocomposites into LED encapsulant domes with grade refractive index structure and remote phosphor configuration.

These and other objects, features, and advantages of the present disclosure will become apparent from the following detailed description of the various aspects of the present disclosure taken in conjunction with the accompanying drawings and examples.

BRIEF DESCRIPTION OF THE DRAWINGS

For the purpose of illustrating aspects of the present invention, there are depicted in the drawings certain embodiments of the invention. However, the invention is not limited to the precise arrangements, dimensions, and instrumentalities of the embodiments depicted in the drawings. Further, as provided, like reference numerals contained in the drawings are meant to identify similar or identical elements.

FIG. 2A are photographs showing homogenous dispersion of grafted $ZrO_2$ nanoparticles within chloroform solution (left) and within brush polymers with no matrix addictives after solvent removal (right). FIG. 2B is a graph illustrating refractive index dispersion of the three types of "matrix-free" nanocomposites.

FIG. 6A is a photograph of PTFE molds and FIG. 6B is a photograph of an epoxy reverse mold. FIGS. 6C-6E are illustrations of the fabrication process of a hemispherical LED encapsulate dome with FIG. 6C showing a double-layer graded refractive index (Inset photograph of a LED encapsulated with the dome), FIG. 6D showing a remote phosphor layer, and FIG. 6E showing conformal phosphor coating layer. Non-wire bond designs (flipped chip dies) are also compatible with this invention. Refractive index: nanocomposite#1<nanocomposite#2 nanocomposite#3.

FIG. 13A: Refractive index dispersion of neat PDMS and "matrix-free" $ZrO_2$/PDMS nanocomposites with three different $V_{filler}$. FIG. 13B: Comparison of measured refractive indices at 633 nm with the Bruggeman model. FIG. 13C: UV-Vis spectra of the three types of "matrix-free" nanocomposites. FIG. 13D: Photograph shows the appearance of the ~0.5 mm thick samples. FIG. 13E: Photograph showing crack propagation in the $ZrO_2$_1k sample after one month.

FIG. 14A: Illustrative cross-section of commercial silicone encapsulated LED and nanocomposite encapsulated LED. FIG. 14B: Light extraction enhancement after encapsulation of commercial silicone and the $ZrO_2$_1k_10k nanocomposite/silicone double-layer. Inset photograph of a nanocomposite encapsulated green LED.

FIG. 17A: $^1H$ NMR spectra of as-synthesized and modified $ZrO_2$ nanoparticles. Cartoon shows one as-synthesized nanoparticle only stabilized by benzyl alcohol and one multimodal brush grafted cross-linkable nanoparticle. (Inset) Photograph showing a transparent matrix-free $ZrO_2$/PDMS nanocomposite with ~50 wt % $ZrO_2$ loading fraction. FIGS. 17B-17E illustrate the variation of the storage modulus G' and loss modulus G" versus curing temperature for different cross-linking agent and catalyst concentration.

FIG. 20A: TEM image and size distribution of the as-synthesized $ZrO_2$ nanoparticles. FIG. 20B: XRD pattern.

FIG. 21C are photographs of a grafted NP sample before and after solvent removal.

FIG. 23, left graph: UV-vis transmittance spectra of $ZrO_2$_1k_10k NP thin film (~0.5 mm) obtained from experiment (solid line) and calculation from Rayleigh scattering equation (dashed line). The yellow area was used to characterize blue absorption. FIG. 23, right graph: The gradual reduction in blue absorption with repeating washing process of the nanocomposite.

DETAILED DESCRIPTION OF THE INVENTION

Figure 1:
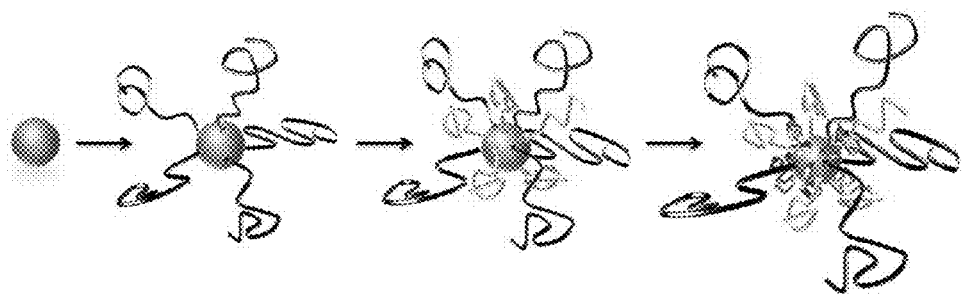
FIG. 1 is a schematic of a configuration of a simplest multimodal polymer brush system on a nanoparticle. Sparsely grafted long brush provides favorable particle/particle entropic interaction, while densely grafted short brush shields enthalpic particle core/core attraction. Additional functional moieties can be used directly as short brushes or bound onto grafted polymer backbones or pendant groups to introduce functionalities including photoluminescence, energy conversion and storage, etc.

The present disclosure generally relates to, inter alia, matrix-free polymer nanocomposites, optic or optoelectronic components comprising the matrix-free polymer nanocomposites as described herein, and methods of making and using the disclosed matrix-free polymer nanocomposites and related products or components comprising the matrix-free polymer nanocomposites. The following description is intended to provide examples of the invention and to explain how various aspects of the invention relate to each other. However, it is important to note that the scope of the invention is fully set out in the claims and this description should not be read as limiting those claims.

In certain aspects, the present disclosure provides a material solution for rapid evolution of optoelectronic technologies, which offers, for example: (i) a wide range of nanofiller loading and significant optoelectronic property enhancement; (ii) controlled spatial organization of optoelectronic parameters (e.g., refractive index, optical absorption/emission) using 3D printing or stamping; and (iii) effective integration of multiple functionalities (e.g., color conversion, environmentally responsiveness). It is known in the art that polymer nanocomposites combine the superior optoelectronic properties of the inorganic nanofillers with the flexibility and processability of the polymeric matrices, provided that the nanofiller dispersion can be stabilized. Greater property enhancement often requires homogeneous dispersion of larger loading fraction of nanofillers, which, however, is challenging, given the strong tendency for macroscopic phase separation between the inorganic nanofiller and polymeric matrix at higher loadings due to their inherent enthalpic incompatibility. Current surface ligand engineering methods have limited success in dispersing large loading fraction (above 40 wt %) of nanofillers in bulk polymers, and traditional nanofiller/surface ligand/matrix nanocomposite systems inevitably have limited achievable filler loadings because both surface ligand and matrix dilute nanofiller concentration.

Based on a highly integrated material platform, the present disclosure provides a polymer nanocomposite where polymer-brush-grafted nanoparticles can be used directly as nanocomposites without the need for any polymer matrix additions. The strongly bound polymer brushes on the nanoparticle surfaces are modified with cross-linkable groups and therefore serve as matrix to provide flexibility, processability, and structural integrity for the cross-linked nanocomposites. Since there is no matrix addition, the range of nanofiller loading fractions is significantly expanded.

As provided by the present disclosure, the use of a multimodal polymer brush configuration further maximizes the achievable nanoparticle loadings and therefore optoelectronic property enhancement while maintaining homogenous dispersion of nanoparticle core within brush polymer, by tailoring polymer brush graft density, molecular weight, and polydispersity. Other advantages of the cross-linkable matrix-free nanocomposites of the present disclosure are the elimination of macroscopic phase separation due to the absence of matrix phase, and the simplification of nanocomposite processing because the filler dispersal or mixing step is no longer needed. The matrix-free polymer nanocomposites of the present disclosure can be cross-linked under different conditions (e.g., heat or UV, depending on the cross-linker selection).

Various macro-, micro-, or nano-structured assemblies of the polymer-brush-grafted nanoparticles can be obtained by molding, direct laser write lithography, 3D printing, and stamping using soft lithography, creating desired spatial organization of optoelectronic parameters carried by the nanoparticles (e.g., graded refractive index structure, photonic crystal structure). In addition, in traditional polymer nanocomposites, introducing additional functionalities often inducing more complex nanofiller dispersion problems because functionalities do not necessarily protect nanofiller against aggregation. The diversity of the material platform developed in the present disclosure allows the integration of additional functionalities without deteriorating the precise control of nanoparticle dispersion and distribution.

For example, as provided in the present disclosure, in a multimodal polymer brush grafted high-refractive-index nanoparticle system, where the longest polymer brush population provides flexibility and ensures cross-linking while shorter brush population offers favorable nanoparticle core-core screening, fluorescent ligands can be independently attached onto nanoparticle surfaces, coupled onto shorter polymer brush population, or doped inside the nanoparticle crystal structure to introduce color conversion functionality. By way of example, the fluorescent matrix-free silicone nanocomposites of the present disclosure can also be used to make elastomeric stamps for high throughput, high resolution nano-imprint lithography. For lightly cross-linking networks (e.g., an organogel), a charged polymer brush can be incorporated into surface ligand systems to enable interactive networks whose geometry and/or refractive index distribution are responsive to external electric field. The multifunctional cross-linkable matrix-free nanocomposites of the present disclosure enables exciting opportunities in next generation solid-state lighting package geometries, luminaire design, and novel optoelectronic technologies.

In one aspect, the present disclosure provides a matrix-free polymer nanocomposite. The matrix-free polymer nanocomposite includes a plurality of polymer brush grafted nanoparticles, which form the nanocomposite in the absence of a polymeric matrix. The polymer brushes grafted to the nanoparticles comprise a multimodal brush configuration having at least two different populations of polymer ligands of different lengths.

The matrix-free polymer nanocomposite of the present disclosure can have various attributes and forms. By way of example, in one embodiment, the matrix-free polymer nanocomposite is in a solid state form. In another embodiment, the matrix-free polymer nanocomposite is a thermoplastic nanocomposite, an elastomer nanocomposite, or a thermoset nanocomposite. The matrix-free polymer nanocomposite can also be cross-linkable. The matrix-free polymer nanocomposite of the present disclosure can have any thickness suitable for use in nanocomposites in all applications. In certain embodiments, the matrix-free polymer nanocomposite of the present disclosure has a thickness of between about 0.1-10 millimeters (mm). In one embodiment, the matrix-free polymer nanocomposite of the present disclosure is an optically transparent nanocomposite with an optical transparency of at least 50%, at least 60%, at least 70%, at least 75%, at least 80%, at least 85%, or at least 90%. In a particular embodiment, the matrix-free polymer nanocomposite of the present disclosure is an optically transparent nanocomposite with a thickness of between about 0.1-10 millimeters (mm), and with an optical transparency of at least 50%, at least 60%, at least 70%, at least 75%, at least 80%, at least 85%, or at least 90%.

For the purposes of this disclosure, the term "nanoparticle" is used in a broad sense, though for illustrative purposes only, typical nanoparticles suitable for use in this disclosure have a particle size of less than 20 nanometers (nm), less than 15 nm, less than 10 nm, less than 7 nm, less than 5 nm in diameter, or less than 2 nm in diameter. In certain embodiments, the nanoparticles are present in the matrix-free polymer nanocomposite at a loading fraction of, for example, at least 10 weight percent (wt %), at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 72 wt %, at least 74 wt %, at least 76 wt %, at least 78 wt %, or at least 80 wt %.

Suitable nanoparticles of the present disclosure may be made from any desired material, such as any material suitable for use in a nanocomposite. By way of example, a suitable nanoparticle of the present disclosure can be made of high refractive index inorganic materials. In certain embodiments, suitable nanoparticles can comprise, without limitation, inorganic materials such as zirconia ($ZrO_2$), titania ($TiO_2$), indium tin oxide (ITO), barium titanate ($BaTiO_3$), zinc oxide (ZnO), zinc sulfide (ZnS), cerium oxide ($CeO_2$), bismuth titanate ($Bi_4Ti_3O_{12}$), hafnium oxide ($HfO_2$), magnesium oxide (MgO), manganese dioxide ($MnO_2$), silica ($SiO_2$), alumina ($Al_2O_3$), cadmium selenide (CdSe), copper oxide (CuO), silver oxide (AgO), and mixtures thereof.

As used herein, the term "multimodal brush configuration" is meant to refer to a nanoparticle having more than one type of polymer ligand grafted to the nanoparticle, with at least two of the types of polymers having different polymer chain lengths. Nonlimiting examples of multimodal brush configurations can include, without limitation, nanoparticles with two (bimodal), three (trimodal), four, five, six, and more different polymer ligands grafted to the nanoparticle.

Any suitable polymer ligand can be used in the polymer brush that is grafted to the nanoparticles to form the nanocomposite of the present disclosure. As described herein, the matrix-free polymer nanocomposite of the present disclosure includes a polymer brush having a multimodal brush configuration that includes at least two different populations of polymer ligands of different lengths. In one embodiment, the multimodal brush configuration is such that the two different polymer ligands comprise a first polymer ligand and a second polymer ligand, where the first polymer ligand is longer than the second polymer ligand.

In another embodiment, the multimodal brush configuration is such that the first polymer ligand is grafted to the nanoparticle at a relatively low density and the second polymer ligand is grafted to the nanoparticle at a relatively higher density. For example, in certain particular embodiments, the relatively low density of the first polymer ligand can range from about 0.01 to about 0.10 ligand chains per square nanometer ($nm^2$), and the relatively higher density of the second polymer ligand ranges from about 0.05 to about 1.0 ligand chains per square nanometer ($nm^2$).

By way of example, suitable polymers used as the polymer ligands of the present disclosure can include, without limitation, polydimethylsiloxane (PDMS), poly(glycidyl methacrylate) (PGMA), poly stearyl methacrylate (PSMA), epoxy, polypropylene, silicone, polyethylene, polyamide, polyimide, polyethyleneterephthalate, polyetherimide, polymethylmethacrylate, polystyrene, polyacrylate, or derivatives thereof.

In certain embodiments, the matrix-free polymer nanocomposite can have a multimodal brush configuration where the polymer ligands have a first end, a second end, and a backbone. In a more particular embodiment, the first end is a group such as, but not limited to, a carboxyalkyl group or a phosphate group.

In one embodiment, the polymer ligands further comprise a cross-linkable moiety at the second end, as a pendant group, or on the backbone of the polymer ligand. Nonlimiting examples of the cross-linkable moiety can include, without limitation, a vinyl group, a styrene group, a propargyl ether group, an epoxy derivative group, and the like. In another embodiment, the polymer ligand is a fluorescent ligand, a cationic polymer ligand, or a ligand leading to a polyelectrolyte or charged polymer.

In another aspect, the present disclosure provides a method of making a matrix-free polymer nanocomposite. This method includes the steps of: (i) providing a plurality of nanoparticles of a same chemical nature; and (ii) grafting a multimodal polymer brush onto the plurality of nanoparticles to yield a plurality of polymer brush grafted nanoparticles forming a nanocomposite in the absence of a polymeric matrix. The multimodal polymer brush comprises at least a first polymer ligand and a second polymer ligand of different.

Suitable nanoparticles, polymer ligands, and other components or aspects of the matrix-free polymer nanocomposites as described herein may be used in this method of making the matrix-free polymer nanocomposite. Therefore, the nanoparticles, polymer ligands, and other components or aspects of the matrix-free polymer nanocomposites are not repeated at this portion of the disclosure, but are incorporated by reference herein.

Grafting of the polymer ligands to the nanoparticles can be achieved in any reaction such that a bond between the nanoparticle and the polymer ligand results, for example, a covalent bond. Several non-limiting examples of acceptable attachment/functionalization reactions are found in the current disclosure and more particularly in the Examples below. In various aspects of the present disclosure, the method of making the matrix-free polymer nanocomposite can be performed to result in varying graft densities of the polymer ligands attached to the nanoparticles. Graft densities within the scope of aspects of the present disclosure include, but are not limited to, 0.01 to 1.0 chains/$nm^2$ (e.g., as measured by ultraviolet-visible-absorption spectroscopy). Attachment of the polymer ligands to the nanoparticles may be accomplished in multiple ways, including, for example, via various grafting reactions. Schematics of examples of suitable grafting reactions are provided in the Examples below and in the accompanying figures.

In a further aspect, the present disclosure provides an optic or optoelectronic component comprising a matrix-free polymer nanocomposite as described herein. In one embodiment, the matrix-free polymer nanocomposite of the optic or optoelectronic component includes a plurality of polymer brush grafted nanoparticles, which form the nanocomposite in the absence of a polymeric matrix. The polymer brush grafted to the nanoparticles comprises a multimodal brush configuration having at least two different populations of polymer ligands of different lengths.

It is also contemplated as within the scope of the present disclosure that the nanoparticles may be modified differently in order to tailor the effect of a particular loading fraction on the refractive index of the nanocomposite material. Tuning of the refractive index by varying the nanoparticles and modifications thereof, and/or by varying the loading fraction of the modified nanoparticles, is one example of how the aspects of the present disclosure may be used to create desirable nanocomposite materials. Potential applications of tuning of the refractive index of a material include: light emitting diode (LED) packaging, light emitter (collector) management, manufacture of ophthalmic lenses, filters, optical adhesives, sensors, highly reflective and antireflective coatings, optical waveguide materials, volume holographic recording materials, and non-linear optical materials, among others.

Another application of aspects of the current invention is to create materials with a tunable, high degree of transparency. Use of appropriate modified nanoparticles and controlled loading of those particles may result in materials with a very high degree of transparency. In this aspect of the invention, the transparency of a nanocomposite material may be tuned by adding specific modified nanoparticles, by tailoring the loading fraction of modified nanoparticles, or both.

In certain embodiments, the optic or optoelectronic component is such so that the matrix-free polymer nanocomposite is part of an apparatus such as, without limitation, a light-emitting diode (LED), a secondary optic that mixes light, a secondary optic that bends light, a visible light communications component, a laser diode, a laser diode array, an optical fiber, an optical waveguide, an optical sensor, an imaging system, a contact lens, an ocular implant, an image display system, an optical lithography system, an optical microscopy system, and an optical-micro-electro-mechanical system (MEMS), also referred to as a micro-opto-electro-mechanical system (MOEMS).

The matrix-free polymer nanocomposites of the present invention can be used in numerous applications. For example, three dimensional (3D) printing (layer-based manufacturing) with the matrix-free polymer nanocomposite by depositing the nanocomposite in a controlled fashion with varying component fraction can effectively form printed-in-place gradient-index (GRIN) lenses. Any application requiring light management (e.g., focusing, illumination, light extraction, sensing, collimation, imaging) can be serviced by such a lens, and the (very small) form-factor that may be afforded by such matrix-free polymer nanocomposite-based optics enables technological applications in many areas in addition to light extraction from LEDs. Non-limiting examples of applications for 3D printed GRIN lenses formed of the matrix-free polymer nanocomposites of the present disclosure are described below.

In one embodiment, the optic or optoelectronic component containing the matrix-free polymer nanocomposite can be a laser diode or a laser diode array. Similar to light extraction from an LED, light extraction needs may be serviced with managed light extraction/collimation from laser diodes.

In another embodiment, the optic or optoelectronic component containing the matrix-free polymer nanocomposite can be an optical fiber. As with LEDs, laser diodes, and laser diode arrays, there is need for light management/focusing/collimation for optical fiber (e.g., getting light into and out of optical fibers). It is contemplated that couplers/lenses formed from 3D printed GRIN-type optics formed of the matrix-free polymer nanocomposites of the present disclosure can assist in getting light into and out of optical fibers.

In another embodiment, the optic or optoelectronic component containing the matrix-free polymer nanocomposite can be an optical waveguide. As with fiber optics, other forms of optical waveguides (e.g., planar waveguides) have the same need for light injection/extraction.

In another embodiment, the optic or optoelectronic component containing the matrix-free polymer nanocomposite can be an optical sensor. Optical sensors (e.g., color sensors based on photodiodes) often need optics for directing/focusing incident light. Incorporating the matrix-free polymer nanocomposites of the present disclosure as part of such a sensor is contemplated by the present disclosure.

In another embodiment, the optic or optoelectronic component containing the matrix-free polymer nanocomposite can be an imaging system. For example, the present disclosure contemplates the use of the matrix-free polymer nanocomposite as applied directly to CCD/CMOS sensors as integral lens.

In another embodiment, the optic or optoelectronic component containing the matrix-free polymer nanocomposite can be a contact lens. Variable refractive index of the matrix-free polymer nanocomposite could increase the efficacy of vision-correcting contact lenses, e.g., for very strong prescriptions in which existing contact lenses cannot achieve sufficient correction.

In another embodiment, the optic or optoelectronic component containing the matrix-free polymer nanocomposite can be an ocular implant. As with contact lenses above, vision corrective devices for direct implantation may also be made from (wholly or in part) the matrix-free polymer nanocomposites of the present disclosure, or otherwise incorporate the matrix-free polymer nanocomposites.

In another embodiment, the optic or optoelectronic component containing the matrix-free polymer nanocomposite can be an image display system. As with imaging systems, image display systems (e.g., micro-projectors) may incorporate an integral lens formed of the matrix-free polymer nanocomposites of the present disclosure.

In another embodiment, the optic or optoelectronic component containing the matrix-free polymer nanocomposite can be an optical lithography system. Optical lithography systems may benefit from the matrix-free polymer nanocomposites of the present disclosure forming integral micro-optics.

In another embodiment, the optic or optoelectronic component containing the matrix-free polymer nanocomposite can be an optical microscopy system. Micro optics, integrated soft optics on optical microscope objective lenses, or optics could be 3D printed directly on microscope slides, and could be applied to enhance optical coupling between sample and microscope. A fully 3D printed microscope could also be formed this way, if GRIN optics composed of deposited matrix-free polymer nanocomposites of the present disclosure were used for the entire optical train.

In another embodiment, the optic or optoelectronic component containing the matrix-free polymer nanocomposite can be an optical-micro-electro-mechanical system (MEMS), also referred to as a micro-opto-electro-mechanical system (MOEMS). Thus, the present disclosure contemplates integrally deposited/printed matrix-free polymer nanocomposite optics in/on optical MEMS (micro-electro-mechanical systems).

Further Discussion of Various Aspects and Embodiments

Various aspects and embodiments of the present disclosure are further described below for purposes of illustration.

The present disclosure provides new polymer nanocomposites and methods for producing such new polymer nanocomposites with: (i) maximum achievable nanofiller loadings and optoelectronic property enhancement; (ii) precise control of nanofiller dispersion and their three dimensional arrangement using methods such as printing and stamping; and (iii) the ability to independently integrate additional functionalities such as color conversion and shaping change induced by external (electric or magnetic) fields. Traditional polymer nanocomposites consist of certain loadings of inorganic nanofiller (optoelectronic property boosters), a polymeric matrix (a continuous phase serves as a medium for binding and holding the reinforcements together into a solid), and often capping agents (surface ligands) to stabilize nanofiller dispersion and suppress macroscopic phase separation, which is essential to deliver the promised property enhancement. In certain embodiments, to obtain greater optoelectronic property reinforcement, larger loading fraction of nanofiller is desired. However, the probability for nanofiller aggregation tends to be larger at higher nanofiller loadings, due to the strong enthalpic incompatibility between inorganic nanofiller with polymeric matrix. Under this circumstance, surface ligands with higher volume fractions are applied to ensure good nanofiller dispersion. Meanwhile, increased matrix content is used to maintain structural integrity. Since both surface ligand and matrix contents dilute the nanofiller concentration, achieving high loading fractions of well-dispersed nanofiller is very difficult for traditional polymer nanocomposites. It becomes even more challenging to control nanofiller dispersion of higher loadings when additional functionalities need to be incorporated into the system, because of more complex enthalpic interactions.

In the present disclosure, there is provided, inter alia, a novel polymer nanocomposite constructed from only one phase, where a surface ligand system consisting of multimodal polymer brushes (more than one population of polymer brushes) is chemically bound onto nanoparticle surfaces. FIG. 1 illustrates the configuration of a simplest multimodal polymer brush system.

At least one population of the polymer brushes contains cross-linkable moieties, and can be cross-linked under different conditions (e.g., heat-cure or UV-cure) depending on the chemistry of the selected cross-linker. Since the cross-linkable brush provides processability and binds the structure together, there is no need for additional matrix polymer, and therefore the nanofiller loading can be maximized. Other advantages of cross-linkable matrix-free nanocomposites of the present disclosure are the elimination of macroscopic phase separation due to the absence of a matrix phase, and the simplification of nanocomposite processing because the filler dispersal or mixing step is no longer needed.

In certain embodiments, two requirements for the matrix-free nanocomposite of the present disclosure are desired. First, the nanoparticle is sufficiently small (less than 20 nanometers (nm), less than 15 nm, less than 10 nm, less than 7 nm, or less than 5 nm in diameter) such that the translational entropy favoring randomized particle distribution becomes more dominate and the nanoparticle core-core attraction can be suppressed. Second, due to the inefficient packing of nanoparticles, at least one population of the polymer brushes must be able to fill the interstitial areas between the nanoparticle cores to avoid particle core percolation. By way of example, high refractive index zirconium dioxide ($ZrO_2$) nanoparticles with ~1.9 nm radaii and low-Tg polydimethylsiloxane (PDMS) silicone polymers with different molecular weights ranging from 1 kg/mol to 36 kg/mol were used as a prototype system in this invention. High refractive index is a desirable feature for optoelectronic materials, and other possible high refractive index nanoparticle candidates include titanium dioxide ($TiO_2$), indium tin oxide (ITO), etc. Silicone is a class of material having wide applications in optoelectronics due to their flexibility, photochemical/thermal stability, high transparency, and tunable hardness. Methods developed in accordance with the present disclosure also apply to other thermoset polymers such as epoxies, polyimides, and urea and melamine formaldehyde formulations.

Figure 2:
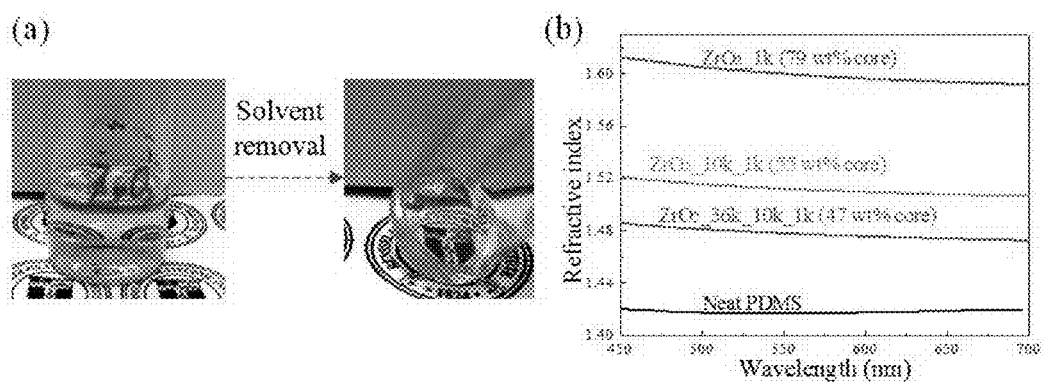
FIGS. 2A-2B.

As shown in FIGS. 2A-2B, the grafted nanoparticles after solvent removal remain highly transparent, indicating uniform dispersion and distribution of nanoparticle cores within the PDMS brush polymer. With increasing nanoparticle core fraction, the measured refractive index was increased up to 14% (at a core fraction of 79 wt % of $ZrO_2$_1k sample, named according to the molecular weight of the grafted PDMS brushes) compared to neat PDMS. Putting multimodal brushes onto nanoparticle surfaces (e.g. $ZrO_2$_10k_1k and $ZrO_2$_36k_10k_1k) is an effective method to tune core-core interaction, core/brush volume fraction, and therefore the overall refractive index of the nanocomposite.

The present disclosure also provides solutions of: (1) how to cross-link the matrix-free $ZrO_2$/PDMS; (2) how to precisely control $ZrO_2$ nanoparticle dispersion, distribution, and obtain complex architecture of nanoparticles; and (3) how to integrate multiple functionalities to achieve advanced optoelectronic functionalities at a wide range of length scales. A few examples of the various applications of the present disclosure are discussed further below in more detail.

Figure 3:
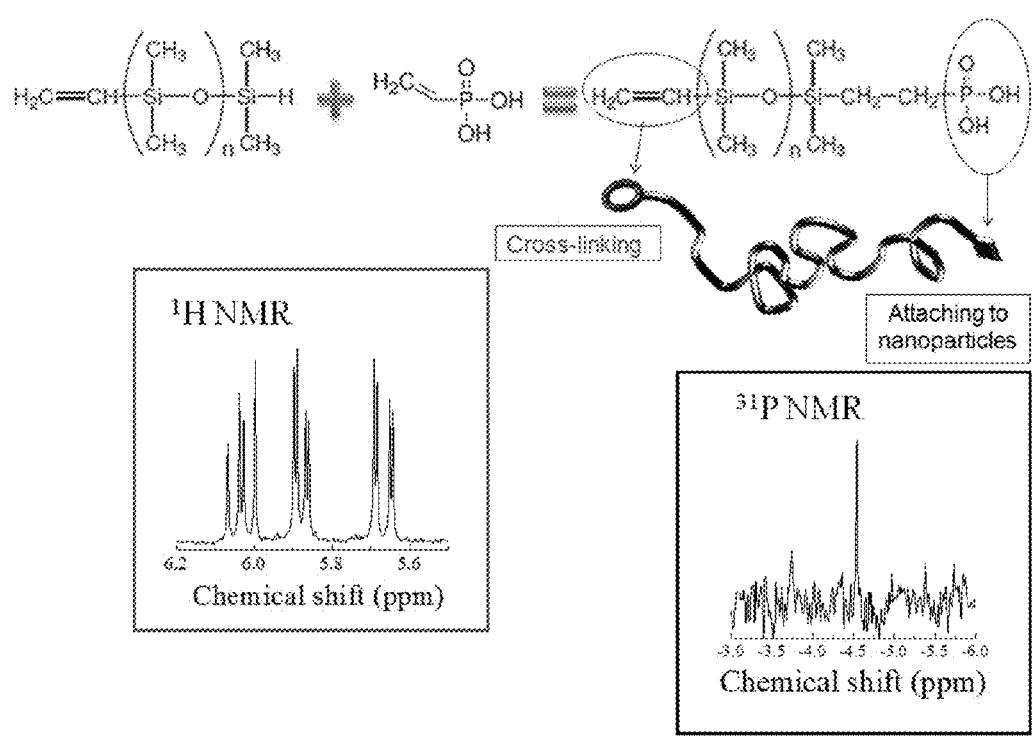
FIG. 3 is a synthetic route to prepare a phosphate-terminated PDMS brushes with a vinyl head group, whose chemical structure is verifies by inset NMR patterns.
Figure 4:
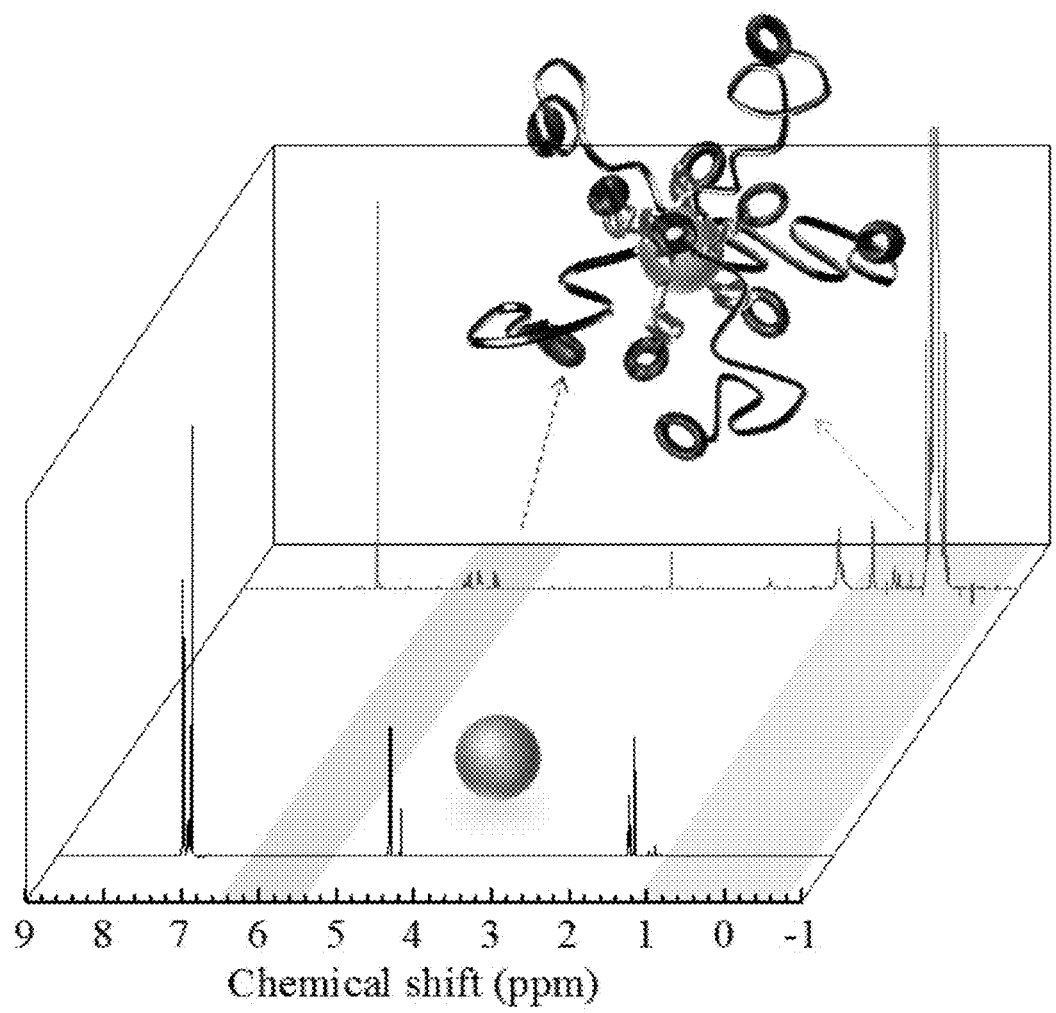
FIG. 4 is an illustration of $^1H$ NMR patterns of the as-synthesized $ZrO_2$ nanoparticles (black curve) and the bimodal cross-linkable PDMS brush grafted nanoparticles (purple curve). Samples are purified and filtered.

Cross-linkable PDMS brushes are designed to contain a phosphonic acid or carboxylic acid group on one end, which can form robust anchors onto nanoparticle surfaces, and cross-linkable moieties (including vinyl groups, styrene groups, propargyl ether groups, etc.) on the other end, as pendant groups, or on the backbone of the polymer chain. The present disclosure demonstrates a synthetic route to prepare a phosphate-terminated PDMS brushes with a vinyl head group, using a simple hydrosilylation reaction, as shown in FIG. 3. The presence of both phosphonic acid group and vinyl group are confirmed using $^{31}P$ NMR and $^1H$ NMR, respectively. The cross-linkable PDMS polymer brushes were then attached onto $ZrO_2$ nanoparticle surfaces using a "grafting-to" technique. FIG. 4 shows a $ZrO_2$ nanoparticle grafted with bimodal cross-linkable PDMS brushes. Compared to as-synthesized nanoparticles, the $^1H$ NMR pattern of the grafted nanoparticle (purple curve) exhibit the characteristic peaks attributable to vinyl group (~5.6 to 6.1 ppm) and the PDMS backbone (~0.2 to 1 ppm), respectively, which are direct evidence of the successful attachment of the cross-linkable PDMS brushes. In addition to "grafting-to", cross-linkable brushes with suitable monomers (e.g. vinyl monomer) can also be attached by grafting from technique, including a variety of controlled radical polymerizations (CRP), such as ATRP, nitroxide-mediated polymerization (NMP) and RAFT.

Figure 5:
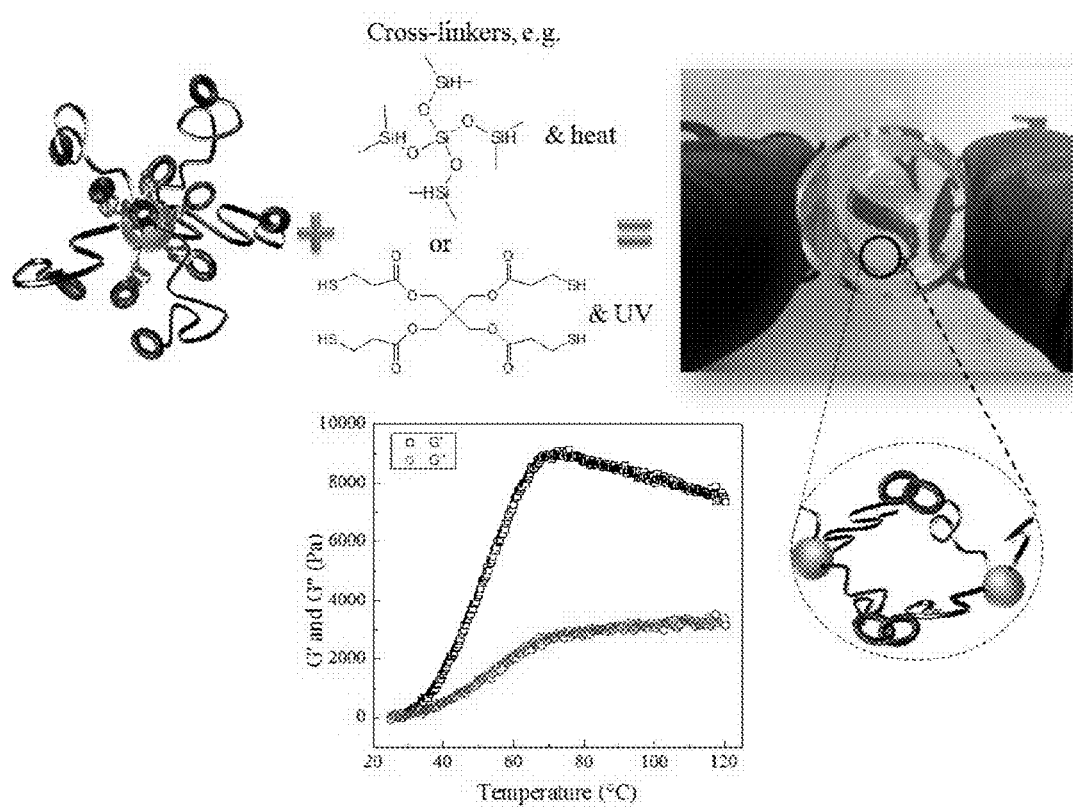
FIG. 5 illustrates cross-linking reactions of a cross-linkable matrix-free nanocomposite. The photograph shows a transparent matrix-free $ZrO_2$/PDMS nanocomposites with more than 50 wt % $ZrO_2$ loading fraction. The graph shows the variation of the storage modulus G' (measures the material's ability to store elastic energy) and loss modulus G" (related to the viscosity or dissipation of energy) versus curing temperature.

The subsequent cross-linking reaction of the grafted nanoparticles may be enhanced by a tri- or tetra-functional cross-linking agent such as tetrakis(dimethylsiloxy)silane and pentaerythritol tetrakis(3-mercaptopropionate). There is a negligible probability of coupling between brush chains grafted onto the same nanoparticle, because polymer brush tends to stretch away from the grafting surface due to the excluded volume effect. The hardness and gel point of the cross-linked matrix-free nanocomposite can be tuned by varying the cross-linking agent and/or Pt catalyst concentrations. By way of example, FIG. 5 shows a cross-linked matrix-free $ZrO_2$/PDMS nanocomposite (cured within a test tube) with a relatively low storage modules (~9000 Pa) and a gel point around room temperature.

In accordance with the present disclosure, taking advantage of the multiple degrees of control over the polymer brush system (functional brush graft density, brush chain length and polydispersity, and core/brush volume fraction ratio), the overall properties of the cross-linked matrix-free $ZrO_2$/PDMS nanocomposites can be tailored. For example, the hardness and modulus are related to cross-linking density and strength of the cross-links; the overall refractive index of the nanocomposite can be tuned by adjusting nanoparticle core volume fractions; longer range spatial organization of the refractive index (e.g., refractive index periodic variations or graded refractive index structures) can be obtained by constructing two or three dimensional nanoparticle assemblies using printing, laser writing, or stamping technologies.

Provided below is a description of certain non-limiting applications of the present disclosure.

Figure 6:
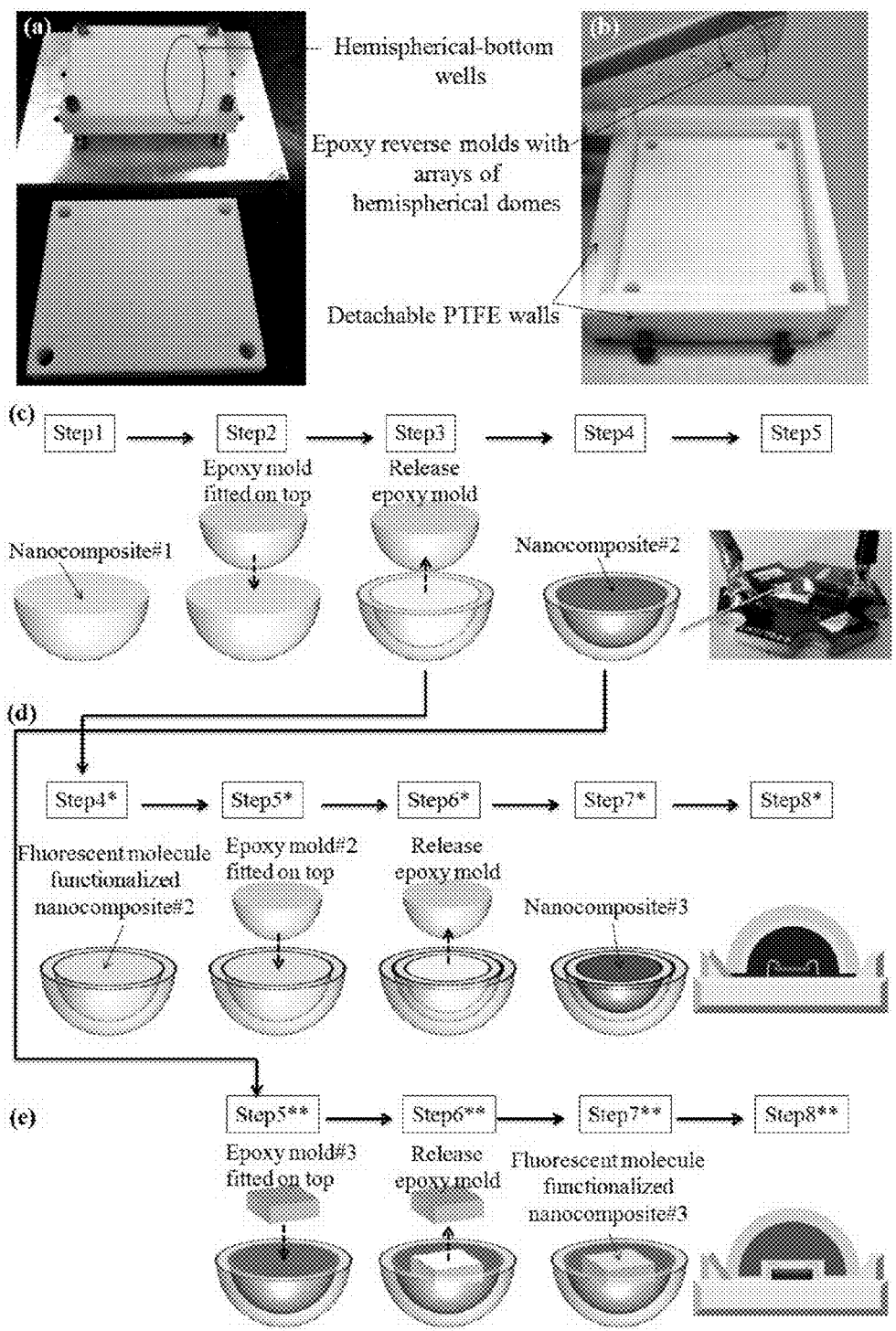
FIGS. 6A-6E.

Molding:

To demonstrate the application of aspects of the present disclosure in advanced optics, a hemi-spherical LED encapsulate dome with double-layered graded refractive index was prepared using a simple and low-cost molding method. By way of example, as shown in FIG. 6A, two PTFE molds with arrays of spherical-bottom wells were made. The diameters of the spherical-bottom wells of the two molds are equal to the diameters of the outer and inner layer of the LED encapsulant dome, respectively. Installing detachable PTFE walls for the PTFE mold with a smaller well diameter can convert the mold into a container (FIG. 6B), which can be used to make an epoxy reverse mold with arrays of hemispherical domes.

One suitable embodiment of a fabrication process of the present disclosure is described in FIG. 6C. First, the hemispherical wells of the PTFE mold were filled with uncured low index nanocomposite. The epoxy reserve mold is then fitted on top of the PTFE mold concentrically during the cross-linking of nanocomposite#1. The epoxy mold was released after complete cure of nanocomposite#1 in step 3. In the final step, the nanocomposite#1 "shell" is filled with nanocomposite#2. The pre-cured dome can then be mounted on a LED with uncured nanocomposite#2 in the reflector cup as an adhesive and then completely cured. Note that the refractive index of the nanocomposite#2 (inner layer, in contact with the LED die) is higher than that of the nanocomposite#1 (outer layer), and the double-layer encapsulant dome increases the light extraction at the die/nanocomposite#2 interface. Given the spherical geometry of the double-layer dome, the total internal reflection at the nanocomposite#2/nanocomposite#1 interface and the nanocomposite#1/air interface is significantly alleviated.

Another solution can be a multi-layer graded index dome, going from higher index on the inside to lower index on the outside, which is discussed in more detail below. The LED optical measurement results have demonstrated that, compared to pure commercial silicone, the double-layered graded refractive index encapsulant dome gives more than 7% increase in light extraction enhancement. Using a similar set of molds, grafted refractive index encapsulant dome with a remote phosphor configuration can be created for white LEDs with improved light extraction efficiency and color uniformity, as illustrated FIG. 6D. A conformal phosphor coating configuration can also be achieved using a similar approach, where another epoxy reserve mold with arrays of cuboid bumps instead of hemispherical domes is used for shaping the inner wall of the encapsulant dome, as shown in FIG. 6E step5**. For LED dies with wire bonds, the size of the cuboid should be big enough to prevent damage to the wire bonds. Another packaging style compatible with aspects of the present disclosure is the flipped chip geometry, which is also more compatible with evolving LED packaging technology. Since the flipped chip LED die has no wire bonds, the only factor to consider when designing the dimension difference between the cuboid and the LED die is the thickness of the phosphor coating. The remote and conformal phosphor coating configurations require very complex fabrication process using current LED packaging technologies.

Figure 7:
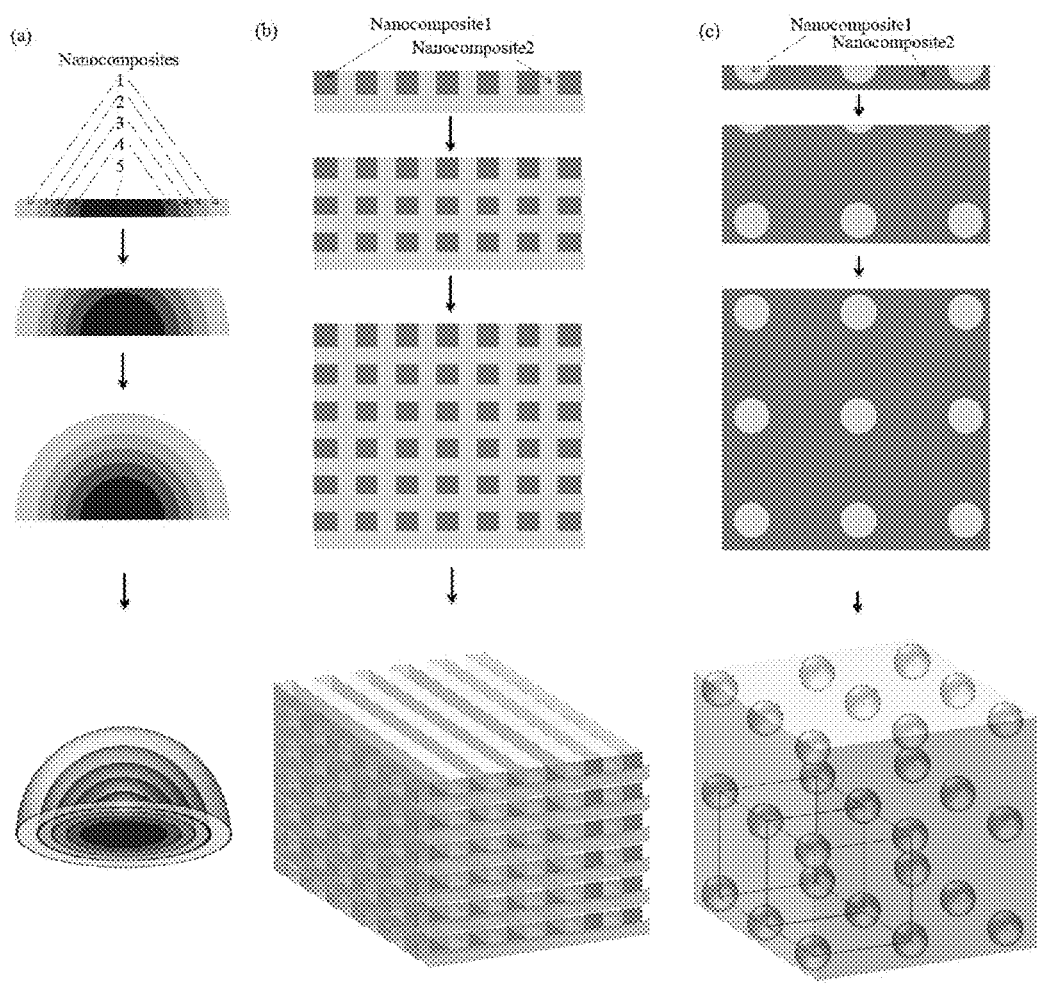
FIGS. 7A-7C are illustrations showing the use of cross-linkable matrix-free $ZrO_2$/PDMS nanocomposites as 3D printing "ink" for the construction of grafted refractive index lens and photonic crystals (shown in FIG. 7A) with wood-pile structure (shown in FIG. 7B) or simple cubic lattice structure (shown in FIG. 7C).
Figure 8:
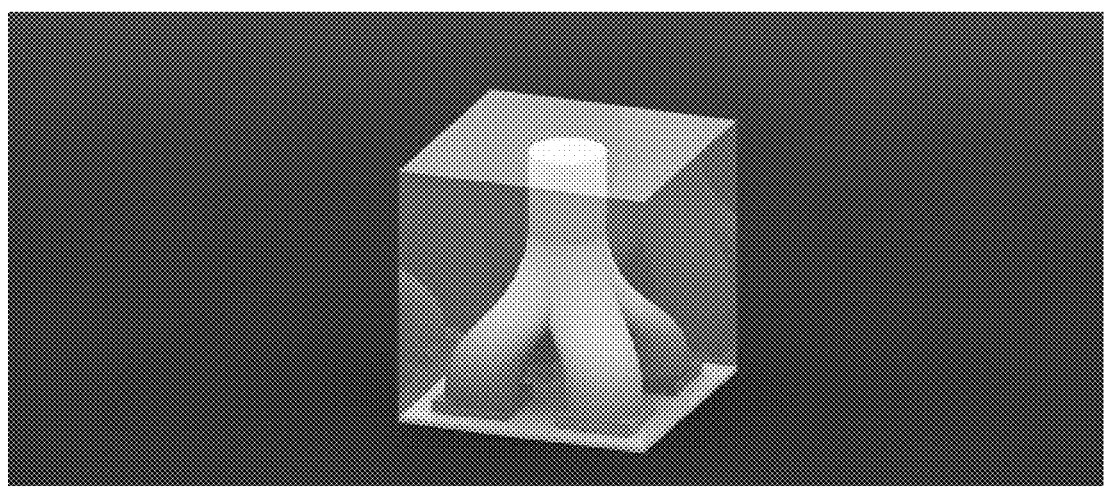
FIG. 8 is a 3D graded refractive index (GRIN) structure applied for efficient color mixing from multi-die LED package.

3D Printing and Photolithography:

In accordance with the present disclosure, and by way of example, more complex nanostructures can be created using 3D printing or lithography of the cross-linkable matrix-free $ZrO_2$/PDMS nanocomposite. For example, multi-layer grafted refractive index structures can be 3D printed, using different cross-linkable matrix-free $ZrO_2$/PDMS nanocomposites as 3D printing "inks" (FIG. 7A). Leveraging the UV-cure properties to cure the nanocomposite fluid can allow easy adoption for use in stereolithogaphy or with alternative UV-cure technologies such as those employed in the PolyJet process. Encapsulants including multiple encapsulant layers with gradually decreasing refractive index and layer thicknesses less than the mean optical scattering length are capable of minimizing Fresnel reflection and scattering losses while maximizing transmittance. In addition to LED encapsulation, such a graded refractive index (GRIN) structure, has wide applications in fiber optics, lenses, antireflection coatings, etc. Since GRIN structures allow the control over the propagation direction of light, 3D-printed graded index structures could be applied to form waveguides. A further example of a particular application of the present disclosure is for color mixing in multi-die LED packages. In such a case, each die could have a unique, graded refractive index (GRIN) structure for efficiently extracting and directing light to a mixing zone where all the GRIN structures meet, as shown in FIG. 8. Very efficient, uniform color mixing could be achieved in this fashion.

Similarly, photonic crystals with, for example, woodpile structure or simple cubic lattice variation of refractive index can also be simply constructed with the application of prism holographic lithography, as shown in FIG. 7A and FIG. 7C. Realizing such high degree of structural control in photonic crystals can otherwise be very challenging using current self-assembly technology and template-based fabrication methods. These complex architectures have wide optoelectronic applications for improved efficiency, directionality, wavelength specificity. For example, photonic crystal structures with controlled defects for waveguiding (which also allows for efficient color mixing) would be valuable. As shown, the present disclosure provides broad applicability of being able to create 3D printed structures with the class of materials provided by the present disclosure.

Figure 9:
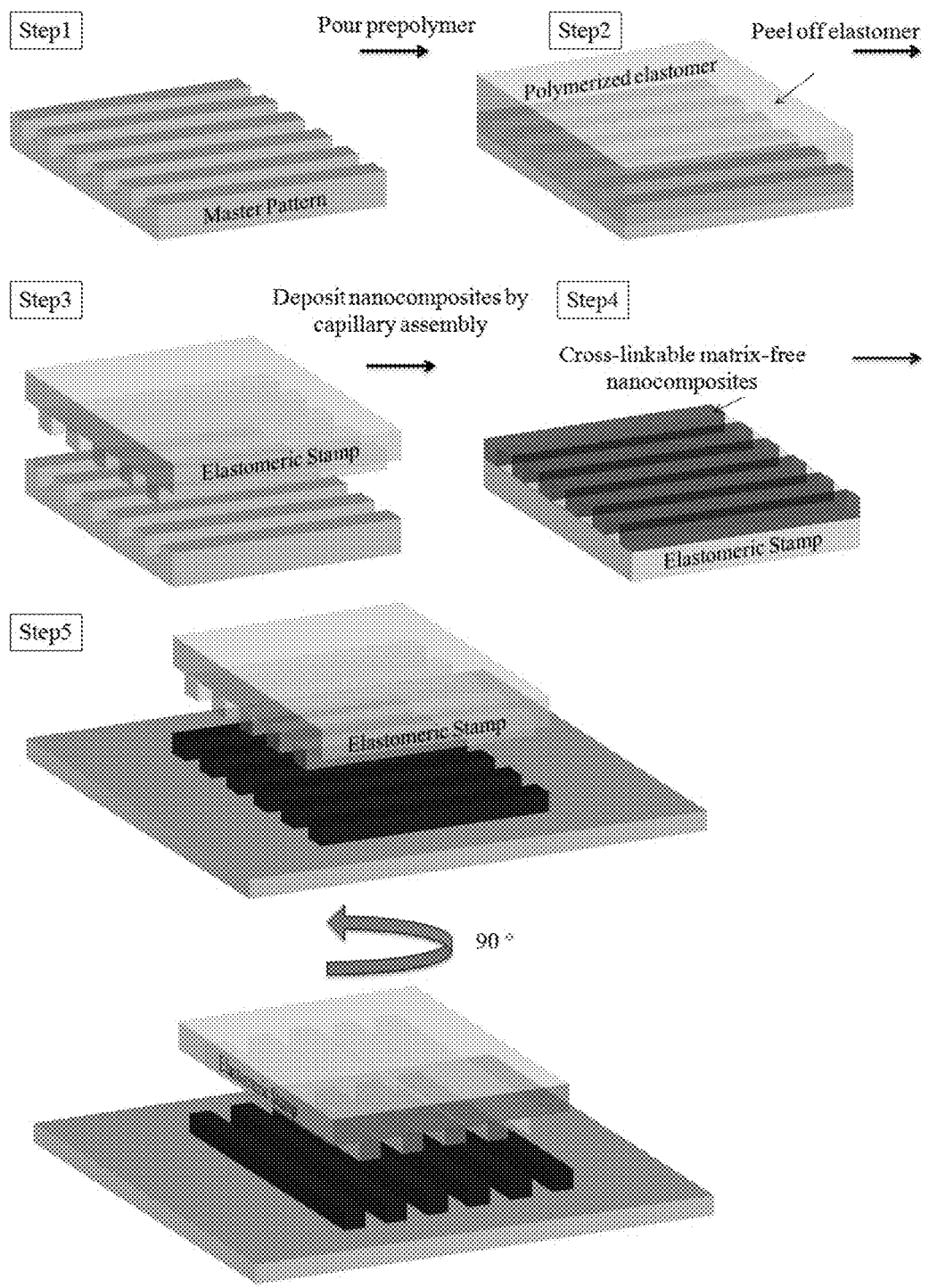
FIG. 9 is a schematic showing the use of the cross-linkable matrix-free nanocomposites as inks for transfer printing in soft lithography.

In one embodiment of the present disclosure, using cross-linkable matrix-free nanocomposites with ~4 nm (in diameter) sized nanocrystals as inks for soft imprint lithography enables high throughput, high resolution fabrication of complex two or three-dimensional macro-, micro- or nano-structures with highly customized graded refractive index patterns. For example, as illustrated in FIG. 9, after obtaining the elastomeric stamp, the cross-linkable matrix-free $ZrO_2$/PDMS nanocomposites with superior wettability can be deposited on the stamp. After cross-linking, the created pattern can be transferred onto designated substrates. When the replicas of the pattern are carefully aligned, a wood-pile photonic crystal structure can be constructed. In addition, taking advantage of the highly integrated surface ligand platform, fluorescent ligands can be independently attached onto the $ZrO_2$ nanoparticle surfaces, coupled onto the shorter polymer brush population, or doped inside the nanoparticle crystal structure. The fluorescent cross-linkable matrix-free $ZrO_2$/PDMS nanocomposites can be used to make the elastomeric stamps for fast and easy alignment (combined with fluorescence microscopy).

Figure 10:
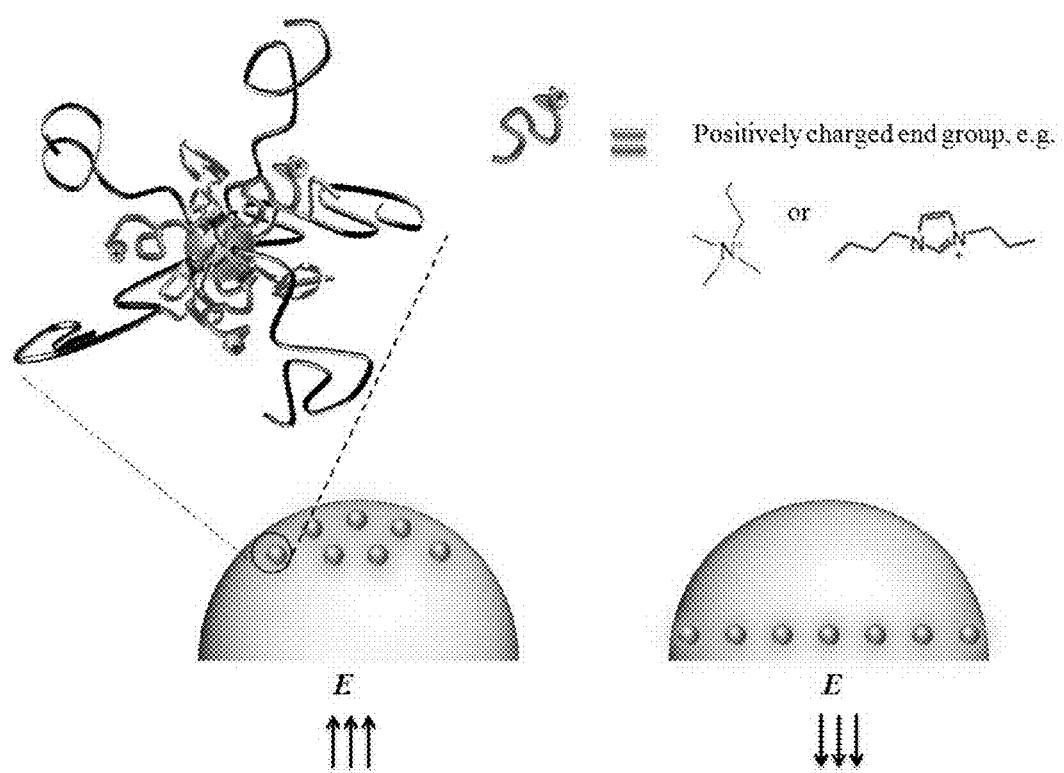
FIG. 10 is a schematic view of an LED encapsulant with dynamically controllable refractive index gradient.
Figure 11:
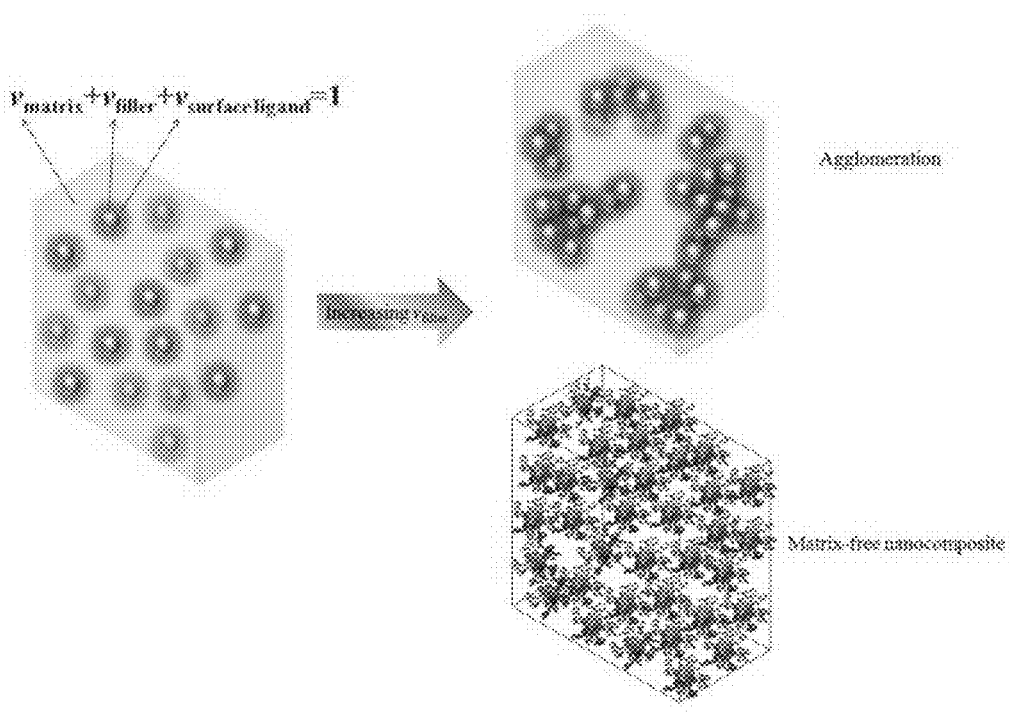
FIG. 11 is a schematic illustration of a conventional three-component polymer nanocomposite system (left) and comparison of nanoparticle agglomeration versus matrix-free nanocomposite for maximized nanocomposite performance enhancement (right).

Additional Functionalities:

The diversity of the polymer brush system of the present disclosure allows for the incorporation of additional functionalities. For example, charged organosilane moieties (with the charge on the nanoparticles being balanced by a counterion) as shown in FIG. 10 can be attached to the nanoparticle surface, and the functionalized nanoparticle can be used as refractive index gradient modifiers for a given material network structure, such as an organogel. Before cross-linking, the cross-linkable matrix-free nanocomposites are liquid-like and responsive to an electric field. After desired nanoparticle concentration gradient (and therefore refractive index gradient in this case) has been induced by an external field, the nanoparticle assembly can be fixed by cross-linking the brush. The various applications in dynamic optical control (at different time scales) include dynamic color tuning and light emission pattern tuning, etc. The mobility of the charged high refractive index nanoparticles depends on the charged moiety graft density, the strength of the cross-links, and the strength of the external electric field. The present disclosure also opens up opportunities for realizing larger scale structures. For example, graded catalytic activity flow structures can be generated by incorporating the functionalized nanoparticles into an aerogel type architecture. Novel graded stoichiometry films can be developed for fuel cells, gas separation membranes, etc.

EXAMPLES

The following examples are intended to illustrate particular embodiments of the aspects of the present disclosure, but are by no means intended to limit the scope thereof. Thus, the aspects of the present disclosure may, however, be embodied in many different forms and should not be construed as being limited to the exemplary embodiments set forth herein; rather, these embodiments are provided so that this disclosure will be thorough and complete, and will convey the concept of the invention to those skilled in the art.

Portions of the Examples presented herein below, and portions of the Background and Summary presented herein above, include information, experimental data, and/or analysis reported or conducted by the inventors in the published article Ying Li et al., "Bimodal 'Matrix-Free' Polymer Nanocomposites," RSC Adv., 5:14788-14795 (2015) and its supplementary information, the entire disclosures of which are hereby incorporated by reference in their entirety.

Example 1

Bimodal Matrix-Free Polymer Nanocomposites

Maximum performance enhancement in polymer nanocomposites is predicated on the simultaneous realization of maximum filler loading, controlled filler dispersion and structural integrity. Through the example of high refractive index $ZrO_2$/polydimethylsiloxane encapsulants for LEDs for enhanced light extraction efficiency, this paper demonstrates that all three properties can be achieved by eliminating the matrix in a single component polymer nanocomposite. Surface bound polymer brushes serve as both the matrix, and stabilizing agent to ensure uniform filler dispersion. The use of multimodal brush configurations that are at least bimodal is the key enabler. This provides sufficient crowding near the particle surface to screen core-core attraction, as well as entanglement between sparsely grafted long brushes to prevent premature cracking. A further widening of the applicability and processing windows are achieved by introducing crosslinkable moieties into the brushes.

Results and Discussion

In the following discussion, high refractive index $ZrO_2$ filled PDMS nanocomposites are used as a model system to demonstrate the basic principles as well as practical applications of "matrix-free" nanocomposites.

Figure 12:
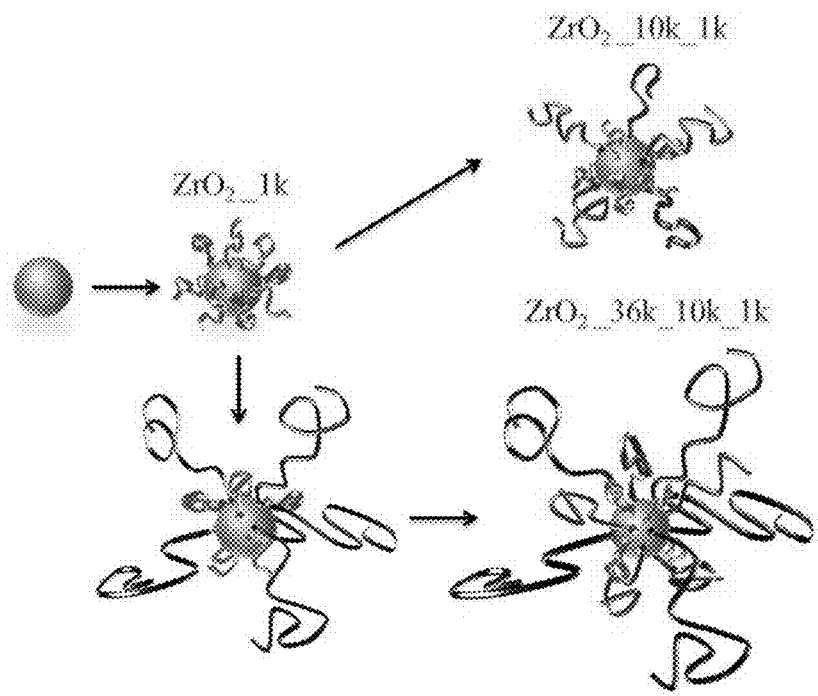
FIG. 12 is a schematic illustration of the preparation of $ZrO_2$_1k, $ZrO_2$_1k_10k, and $ZrO_2$_1k_36k_10k nanoparticles via a multiple-step "grafting-to" process.
Figure 20:
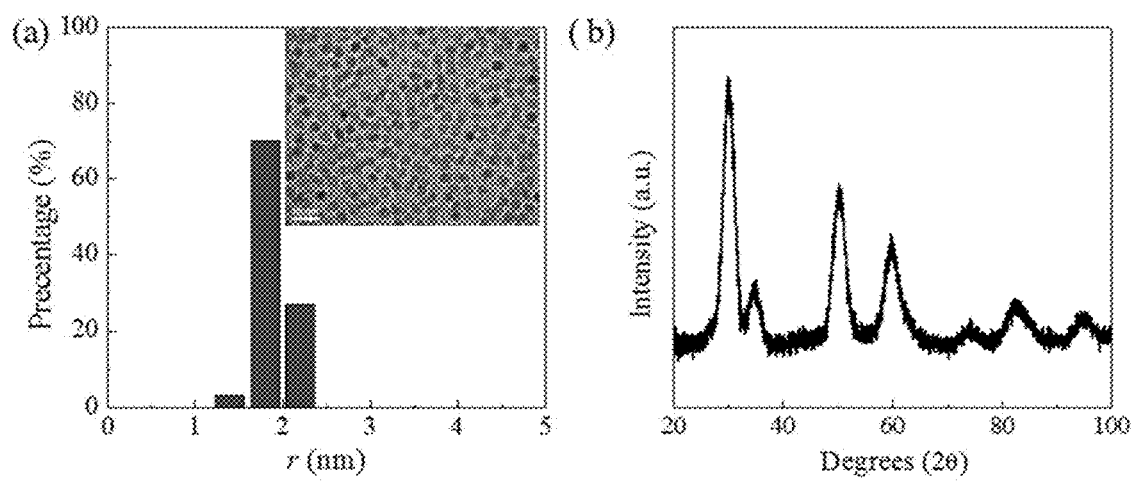
FIGS. 20A-20B are as follows.

Refractive Index Engineering:

Spherical $ZrO_2$ nanoparticles were synthesized using a non-aqueous surfactant-free synthetic approach adapted from the procedure reported by Garnweitner et al.[26] Commercially available carboxyalkyl-terminated PDMS brushes and phosphate-terminated brushes obtained through phosphoryl chloride modification were used to graft onto the nanoparticle.[15] There are three decisive advantages of the synthesized $ZrO_2$ nanoparticles for use as optical nanofillers. First, the near monodisperse, ~1.9 nm in radius nanoscale $ZrO_2$ particles reduce light loss from scattering when homogenously dispersed in a transparent polymer (see FIG. 20A for TEM and size distribution). Second, the cubic $ZrO_2$ (see FIG. 20B for XRD pattern), with an isotropic refractive index of 2.2 at 589 nm,[27] is a desirable refractive index enhancer with no significant light scattering loss resulting from grain boundaries.[28] Third, since there is no additional surfactant (other than the solvent benzyl alcohol) intentionally introduced in the nanoparticle synthesis, the surfaces of the as-synthesized nanoparticles are highly accessible for post-functionalization. Monomodal, bimodal, and trimodal PDMS grafted nanoparticles, $ZrO_2$_1k, $ZrO_2$_1k_10k, and $ZrO_2$_1k_36k_10k, respectively, named according to the molecular weight of the brushes, were prepared via a multiple-step "grafting-to" process, as shown in Scheme 2 (FIG. 12). Note that the sequence of the "grafting-to" reaction plays an important role in obtaining grafted nanoparticles with proper graft densities. The purpose of grafting the shortest carboxyalkyl-terminated PDMS brush (1 k) before the other "grafting-to" reactions is twofold: (1) One inherent limitation of the "grafting-to" method is the rapidly decreased graft density with increased brush length attributable to the increased difficulties for longer brush diffusing through the grafting surface.[11, 15] The relatively densely grafted 1 k PDMS brush provides initial stable solvent suspension for the following "grafting-to" reaction. (2) Compared to the phosphate-terminated PDMS brushes, the anchoring of the carboxyalkyl-terminated PDMS brush is relatively weak,[29, 30] leaving adequate probabilities for sequential grafting of phosphate-terminated PDMS brushes to prepare bimodal or even multimodal polymer brush grafted nanoparticles. For the phosphate-terminated PDMS brushes (36 k and 10 k), on the other hand, it is important to graft the longer brush first and then back fill the remaining grafting sites with shorter brush to ensure that the existence of the grafted brush does not impose a significant barrier for the shorter brush to reach the grafting surface.

Figure 21:
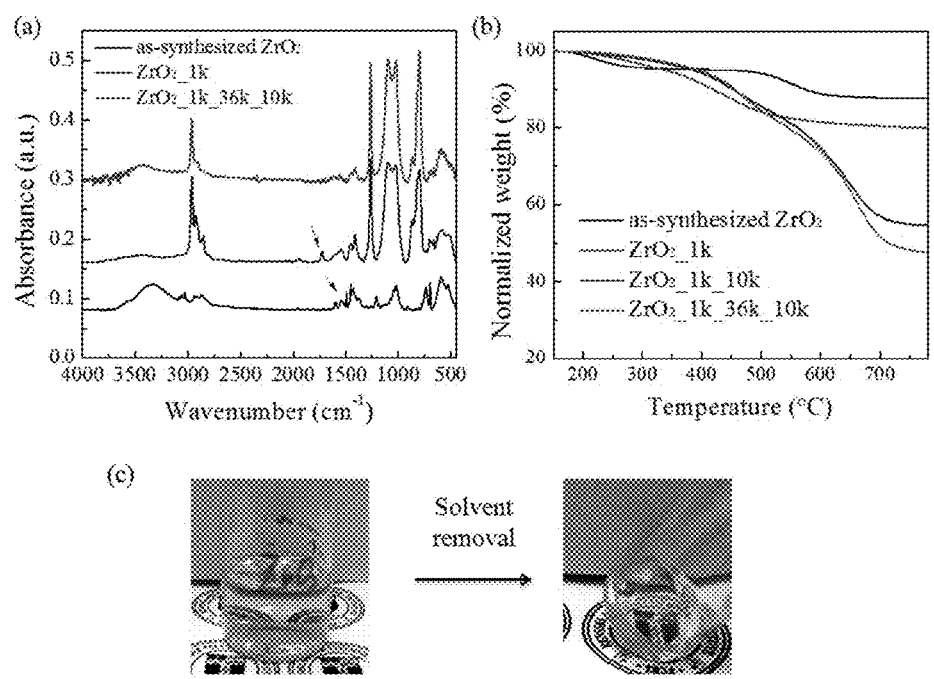
FIGS. 21A-21C illustrate FTIR spectra (FIG. 21A) and TGA curves (FIG. 21B) of $ZrO_2$ nanoparticle at different grafting steps.

The $v_{filler}$ of $ZrO_2$_1k, $ZrO_2$_1k_10k, and $ZrO_2$_1k_36k_10k nanoparticles were estimated as 79 wt %, 53 wt %, and 44 wt %, respectively, using thermo gravimetric analysis (TGA) weight loss measurement (FIG. 21). To get a better understanding of grafted nanoparticle dimensions and architecture, each step of the "grafting-to" reaction was also monitored. The graft density of each PDMS brush was calculated first based on the corresponding weight loss ratio and the number of grafting chains (determined by TGA after each step of "grafting-to"), and surface area of nanoparticles using:[31]

$$\sigma = (wN_A/M_n)/(4\pi a^2 n)$$

where w, $N_A$, and n are the weight of polymers, Avogadro's number, and the number of nanoparticles, respectively. As listed in Table 1 (see Example 2 for a detailed description of the calculation), at low enough graft density, $\sigma<1/R_g^2$, we assume that individual chains take mushroom-like conformations on the grafting surface with a thickness of the radius of gyration.[32, 33]

TABLE 1

Dimensions and graft densities of PDMS brushes.[a]

| | | | $\sigma$ (ch/nm$^2$) | | |
|---|---|---|---|---|---|
| Brush | r/R$_g$ | 1/R$_g^2$ | ZrO$_2$_1k | ZrO$_2$_1k_10k | ZrO$_2$_1k_36k_10k |
| 1k | 1.9 | 0.96 | 0.28 | 0.20 | 0.12 |
| 10k | 0.59 | 0.10 | — | 0.10 | 0.05 |
| 36k | 0.31 | 0.03 | — | — | 0.02 |

[a]Nanoparticle core radius, brush radius of gyration and graft density are denoted by r, R$_g$, and $\sigma$, respectively.

After solvent removal, the visual appearance of the grafted nanoparticle films remains highly transparent, indicating uniform dispersion and distribution of nanoparticle cores within the PDMS brush polymer. Therefore, the terms "grafted nanoparticles" and "matrix-free nanocomposite" are used interchangeably.

Figure 13:
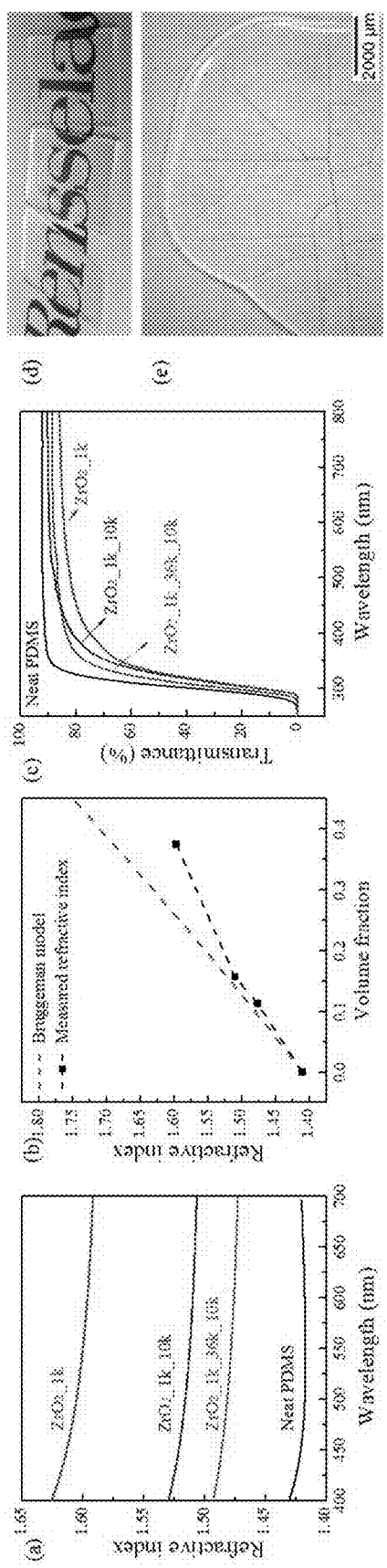
FIGS. 13A-13E as as follows.

With increasing $v_{filler}$, the measured refractive index increased up to 14% (ZrO$_2$_1k) compared to neat PDMS, as shown in FIG. 13A. The dependence of the effective refractive index of the "matrix-free" nanocomposite on its $v_{filler}$ was described by the Bruggeman formula in FIG. 13B.[34]

$$v_{filler}[(\varepsilon_p-\varepsilon_{eff})/(\varepsilon_p+2\varepsilon_{eff})]+(1-v_{filler})[(\varepsilon_m-\varepsilon_{eff})/(\varepsilon_m+2\varepsilon_{eff})]=0$$

where $\varepsilon_p$ and $\varepsilon_m$ are the dielectric constants of the nanoparticles and matrix, respectively, and $\varepsilon_{eff}$ the effective dielectric constant of the nanocomposite. For the ZrO$_2$_1k sample with the highest $v_{filler}$, there is a significant deviation from theoretical prediction. The discrepancy could be due to decreased refractive index of the nanoparticles compared to the bulk material as a result of quantum size effects.[35] Another possible explanation is the complex interaction between adjacent nanoparticles when the interparticle distance is smaller than the particle size (r/R$_g$~1.9). For example, interfering wave functions of electrons may change the dipole polarizability.[36] As shown in FIG. 13C, all the nanocomposites show high transparency, comparable to neat PDMS in the visible light range (the ~9% intensity loss for the neat PDMS sample in the 400 to 800 nm range is due to reflection losses at the air/film/glass slide interfaces[37]). Since both the ZrO$_2$ nanoparticles and PDMS are assumed to be intrinsically transparent to visible light, Rayleigh scattering becomes the dominant transparency loss mechanism.[5, 38, 39] The effective suppression of Rayleigh scattering in the nanocomposites is direct evidence of sufficiently uniform dispersion of the ZrO$_2$. The slight decrease in the transmittance (~5%) of the ZrO$_2$_1k sample can be attributed to the less robust stabilizing effect of the 1 k carboxyalkyl-terminated PDMS brushes compared to the 10 k and 36 k phosphate-terminated ones.

Figure 22:
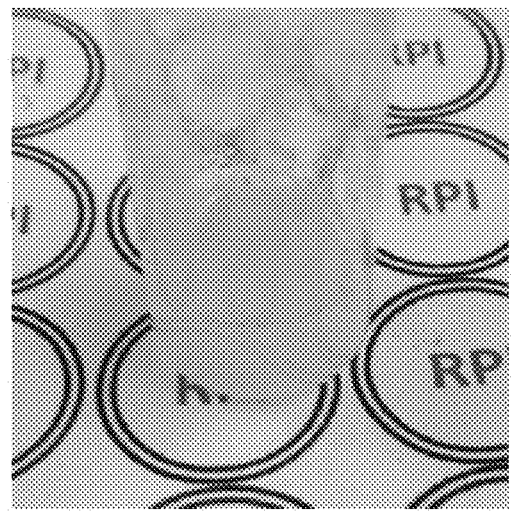
FIG. 22 is a photograph showing cloudy $TiO_2$_36k_10k nanoparticle packing after solvent removal.

The "matrix-free" nanocomposite approach is applicable across many other metal oxide/polymer hybrid systems. Two requirements must be met in order for the transparent "matrix-free" approach to be implemented successfully. First, the nanoparticle must be sufficiently small (typically less than 5 nm in diameter) such that the translational entropy favoring randomized particle distribution becomes more dominant and the particle core-core attraction can be suppressed more easily. Second, due to the inefficient packing of nanoparticles, at least one population of the polymer brushes, the 1 k brush in this case, must be smaller than the particle and be able to isotropically fill the interstitial space between the nanoparticle cores to avoid particle percolation. TiO$_2$_36k_10k nanoparticles studied previously,[15] with higher effective vdW core-core attraction (graft densities of 10 k and 36 k brushes are 0.03 and 0.01 ch/nm$^2$, respectively) and bigger particle size (r/R$_g$~0.77 for the 10 k brush), appeared to be cloudy after complete solvent removal (FIG. 22). To study grafted nanoparticle packing more systematically, useful tools include genetic algorithm and Monte Carlo simulations,[40] assuming that the brush is in a mushroom conformation on the grafting surface. For concentrated and semi-dilute polymer brush regimes, experimental and theoretical studies on assembling and ordering of solvent-free hairy nanoparticles has also been conducted to relate the architecture of the nanoparticle assembles and their physical characteristics.[41-43]

Applications in LED Encapsulation:

Incorporating uniformly dispersed high refractive index metal oxide nanoparticles into encapsulant polymers is a promising strategy to reduce the refractive index mismatch between the LED die and its surrounding medium, and therefore enhance the light extraction efficiency.[5, 44] The ZrO$_2$_1k sample with the highest refractive index enhancement and optical transparency seems to be the most promising candidate for practical optical applications. However, after aging in an ambient environment for a few weeks, the ZrO$_2$_1k sample cracked, as shown in FIG. 13E. The cracks, probably caused by capillary forces arising from solvent evaporation, are not observed in the ZrO$_2$_1k_10k and ZrO$_2$_1k_36k_10k samples. The poor crack resistance of the ZrO$_2$_1k sample can be attributed to the lack of entanglement for the 1 kg mol$^{-1}$ short brush chains. Two parameters need to be investigated in order to understand this phenomenon: the entanglement molecular weight, $M_e$, denoting the average molecular weight spacing between entanglement junctions, and the critical molecular weight, $M_c$, which separates the dependence of zero-shear viscosity on molecular weight for short and long chains.[45] The published values of $M_e$ for linear PDMS are around 12,000 g mol$^{-1}$ and $M_c$ ranges from 21,000 to 29,000 g mol$^{-1}$, which agree well with the empirical relation $M_c/M_e$~2 for amorphous melts.[12, 46-49] The molecular weight of the longest brush in the ZrO$_2$_1k_10k sample is only half of $M_c$, thus cracking could also be expected in this sample. However, the average number of chain ends per polymer can affect the value of $M_c$.[45, 50] Utilizing an immiscible polymer blend whose interface is reinforced with corresponding diblock copolymers, Kramer and co-workers have suggested that, while the onset of entangled behavior in a polymer melt requires an average of two entanglements per chain (consistent with $M_c$~2$M_e$), one "entanglement" between each block and its corresponding homopolymer is enough to have stress transfer at the interface.[50, 51] This is consistent with the observation of Choi et al. that pronounced interactions between entanglements of surface-grafted polymer chains give rise to significant increased resistance to fracture of the 'quasi-one-component' nanocomposite.[13] Since one end of the 10 k brush has been chemically grafted onto the nanoparticle surface, it is also reasonable to postulate that having one "entanglement" for each 10 k brush chain (requires a molecular weight half of $M_c$) is sufficient to hinder cracking.

Figure 14:
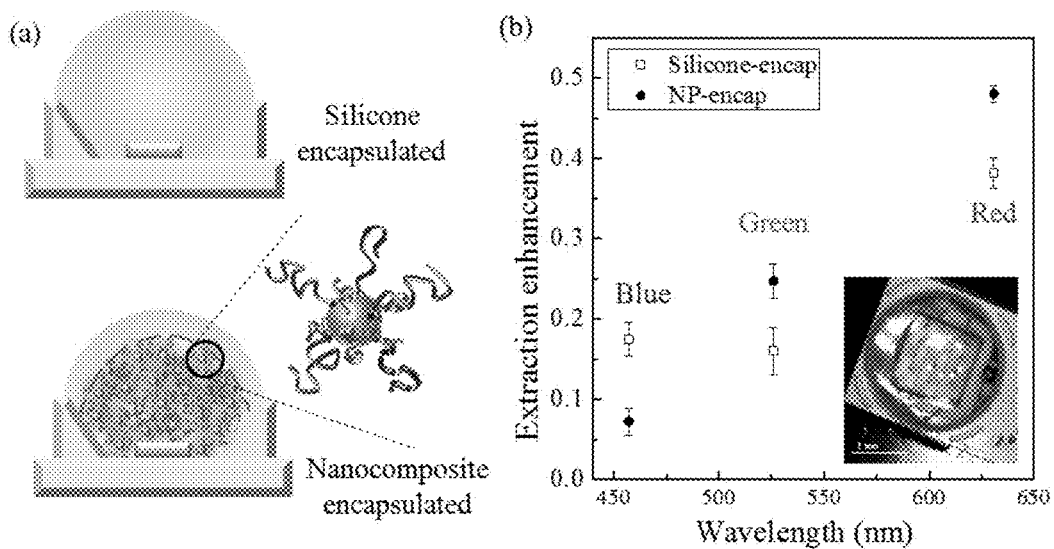
FIGS. 14A-14B are as follows.
Figure 23:
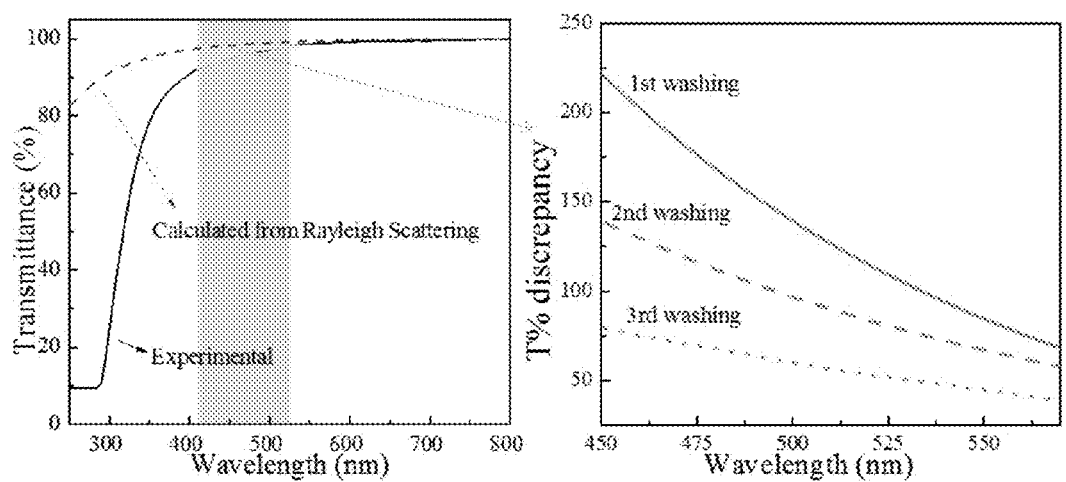
FIG. 23 is as follows.

ZrO$_2$_1k_10k samples were used for LED encapsulation. Using a well-controlled encapsulation process, commercial pure silicone and nanocomposite encapsulant (a silicone shell was molded to protect the un-crosslinked nanocomposite) with identical hemi-spherical geometry were mounted onto LEDs for optical output characterization, as shown in FIG. 14. Commercial silicone encapsulated red and green LEDs exhibit an average of 38% and 16% optical output power enhancement, respectively, compared to un-encapsulated LEDs, while the nanocomposite encapsulated LEDs exhibit an average of 48% and 24% enhancement. Ma et al. modeled and experimentally investigated the influence of the refractive index of the LED encapsulant on light-extraction efficiency due to high refractive index encapsulants, using low-power LEDs.[52] In our case, the light-extraction enhancement is less significant than the theoretical prediction in Ma's work because surface-roughened high-power LEDs were used in the current study. Less significant light extraction improvement was observed in blue LEDs. Careful examination of the appearance of the "matrix-free" $ZrO_2$/PDMS nanocomposite after solvent removal reveals a slightly yellowed color. It has been reported previously that the $ZrO_2$ nanoparticles synthesized using a non-aqueous approach resulted in a slightly yellow solvent suspension before surface modification.[26] The yellow-colored organic species leads to absorption of blue light and therefore reduced light extraction enhancement (see FIG. 23 for rationale).

Figure 15:
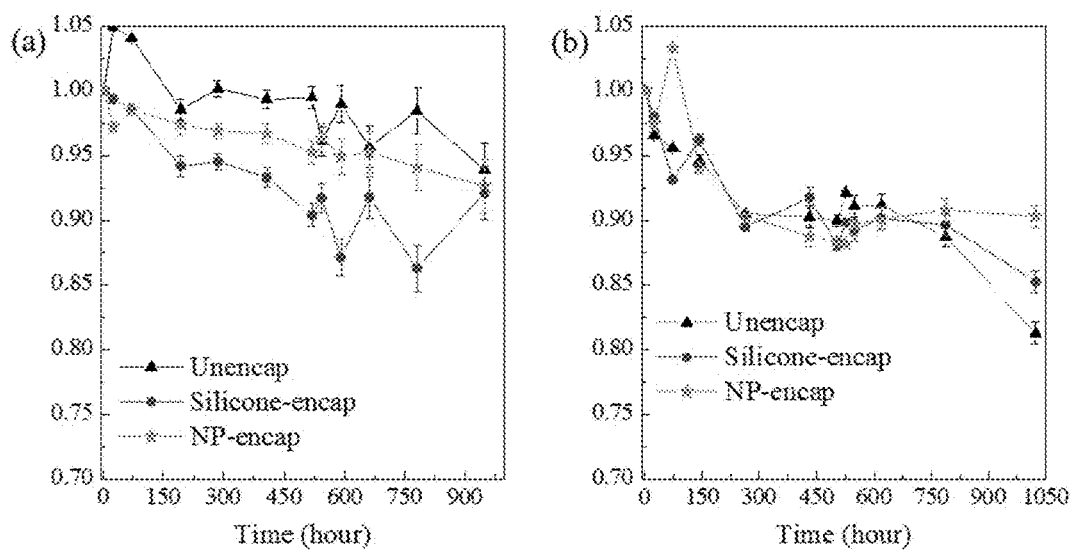
FIGS. 15A-15B illustrate the degradation of optical output power for different green LED packages. LED forward current was maintained at 100±3% mA for 500 hours and then 350±3% mA for 500 hours (as shown in FIG. 15A); and at 500±3% mA for 500 hours and then 1000±3% mA for 500 hours (as shown in FIG. 15B).

To further validate the performance of the matrix-free nanocomposite as novel LED encapsulant, an accelerated aging test was conducted. The reliability of the encapsulant material is directly related to the durability of a LED package. In a preliminary reliability evaluation, the aging tests were performed in a chamber placed in a constant temperature (24±2° C.) and humidity (60±5%) environment, and the chamber is equipped with a programmable D.C. power supply, an air-cooling system, and multi-channel temperature/current monitoring systems. The optical output powers of unencapsulated, silicone- and nanoparticle-encapsulated green LEDs were measured as a function of time. Two sets of experiments were conducted. For the first set of experiments, the LEDs were held at 100±3% mA for 500 hours and then 350±3% mA for 500 hours. The other set of experiments started at 500 mA for 500 hours and then 1000±3% mA for 500 hours to perform a high intensity test and accelerate aging. The optical output was normalized to the onset state for each set of experiments accordingly. As shown in FIG. 15, the nanocomposite-encapsulated LEDs exhibit high reliability (more than 90% lumen maintenance) at up to 1 A driving current. Since commercial high-refractive-index silicone encapsulant often suffers from poor processability and thermal stability due to the high phenyl content,[15, 16] the matrix-free nanocomposite presents a promising alternative for highly efficient LED devices and new luminaire design. It is expected that with an improved nanoparticle synthetic method the light extraction efficiency and reliability of encapsulated LEDs can be further improved.

Figure 16:
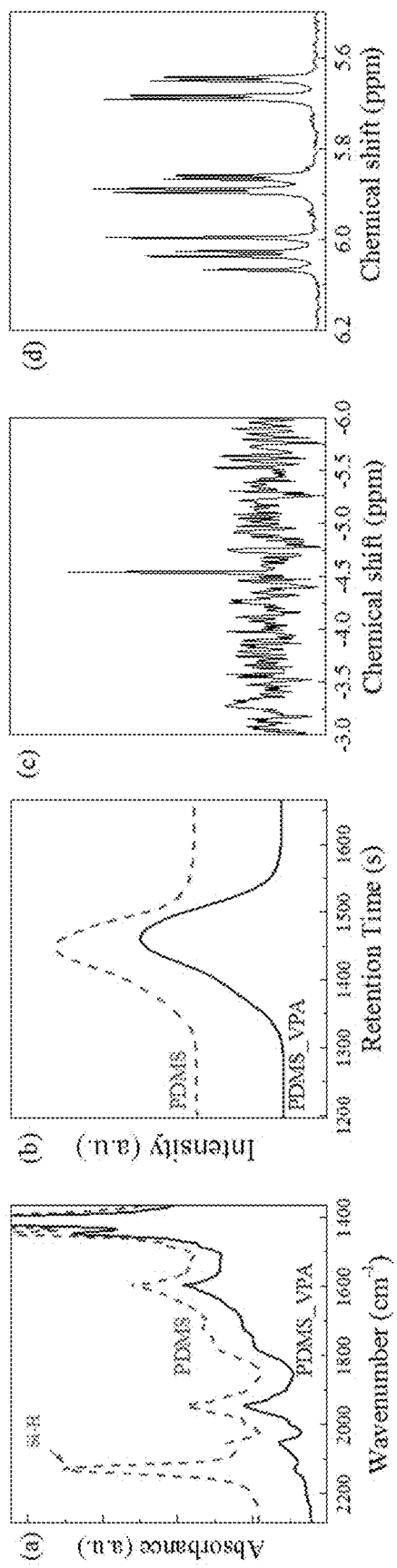
FIGS. 16A-16D are as follows: FTIR (FIG. 16A), GPC (FIG. 16B), $^{31}P$ NMR (FIG. 16C), and $^1H$ NMR (FIG. 16D) analysis of the 10 k* cross-linkable brush synthesized through hydrosilylation reaction.
Figure 24:
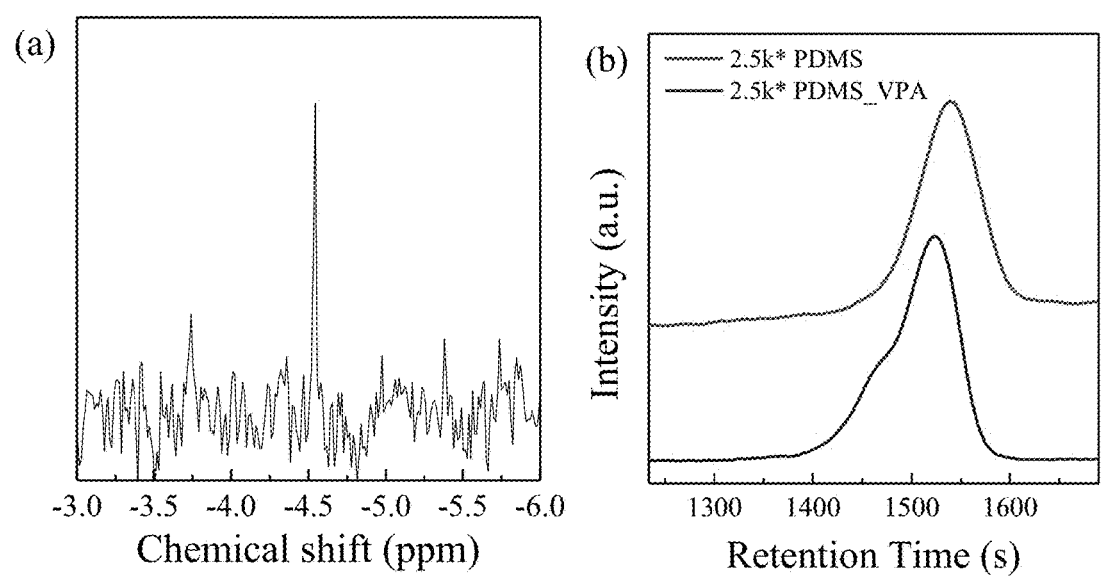
FIGS. 24A-24B are graphs illustrating $^{31}P$ NMR (FIG. 24A) and GPC (FIG. 24B) analysis of the 2.5 k* cross-linkable brush synthesized through hydrosilylation reaction.

Cross-Linkable "Matrix-Free" Nanocomposites:

The transparent high refractive index "matrix-free" $ZrO_2$/PDMS nanocomposites discussed thus far can be reversibly dissolved in chloroform. For improved structural integrity, the incorporation of a cross-linkable group into the brush polymer was examined. As a proof-of-concept, PDMS brushes with a phosphonic acid group on one end serving as a robust anchor onto the nanoparticle surface, and a cross-linkable vinyl group on the other end were synthesized through a hydrosilylation reaction between α-monovinyl-ω-monohydride terminated PDMS and vinyl phosphonic acid. The 10 kg mol$^{-1}$ and 2.5 kg mol$^{-1}$ cross-linkable brushes were named 10 k* and 2.5 k*, respectively, where the "*" differentiates the cross-linkable brush from the normal 1 k brush. The chemical structure of the synthesized cross-linkable brushes was investigated using a combination of FTIR, GPC, $^{31}$P NMR, and $^1$H NMR, as shown in FIG. 16 (only 10 k* brush characterizations are shown here, see FIG. 24 for 2.5 k* brush analysis). The completion of the hydrosilylation reaction was first confirmed by the disappearance of the strong silicone hydride stretching band at 2127 cm$^{-1}$ in the FTIR spectra[53, 54], which were normalized according to the Si—CH$_3$ stretching band at 1256 cm$^{-1}$.[53, 55] GPC analysis shows a monomodal molecular weight distribution before and after the reaction, suggesting the occurrence of polymeric byproducts was successfully suppressed. The single peak around −4.5 ppm in the $^{31}$P NMR spectrum can be attributed to the phosphate end group, while the $^1$H NMR pattern exhibits the characteristic peaks attributable to the vinyl protons.[56]

Figure 17:
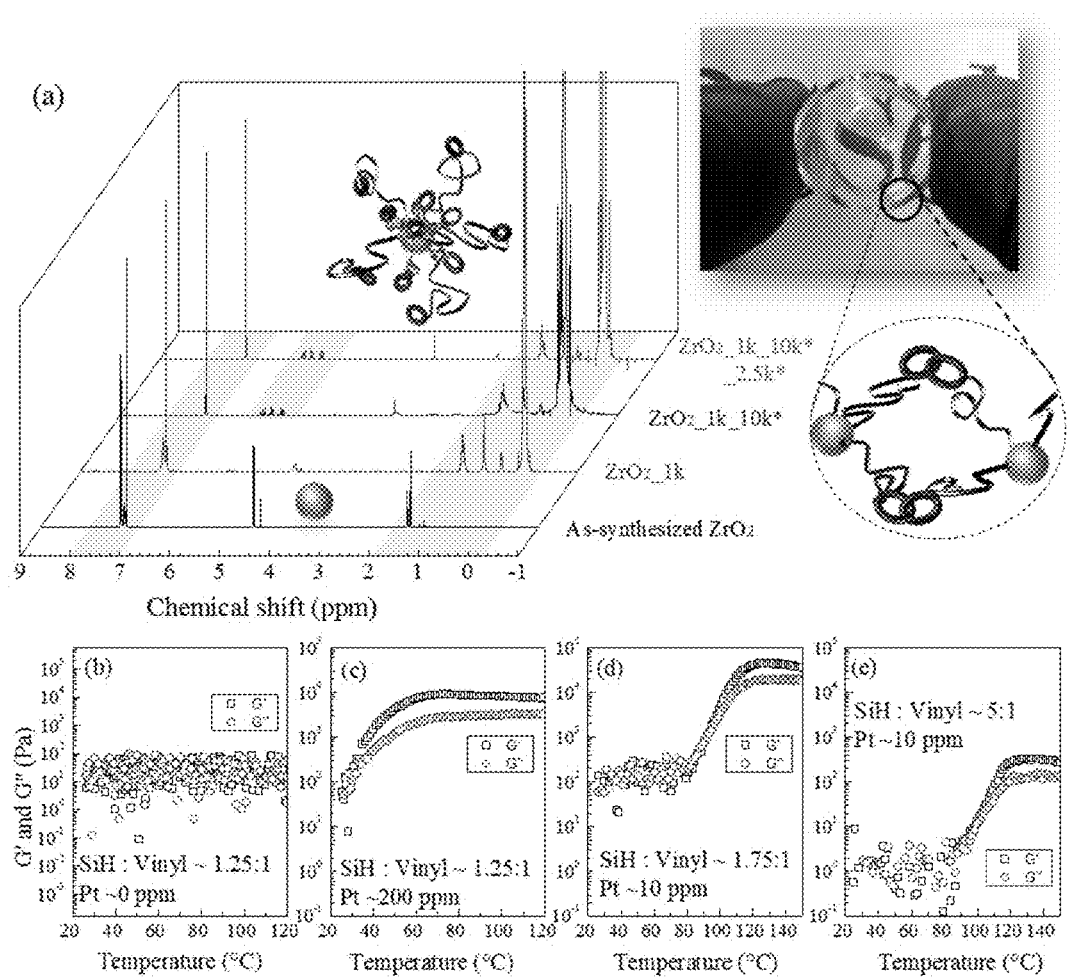
FIGS. 17A-17E are as follows.
Figure 25:
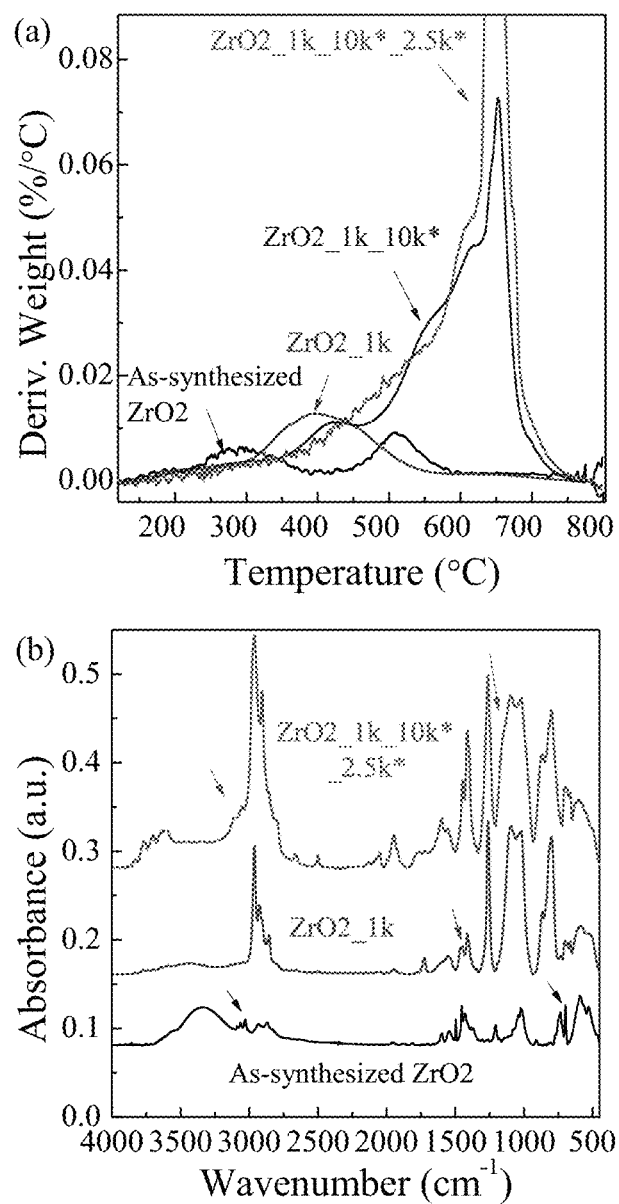
FIGS. 25A-25B are graphs illustrating derivative weight loss (FIG. 25A) and FTIR comparison (FIG. 25B) of as-synthesized and modified cross-linkable $ZrO_2$ NPs.

The cross-linkable 10 k* and 2.5 k* brushes were grafted onto $ZrO_2$_1k nanoparticles sequentially, and each "grafting-to" step was monitored using $^1$H NMR analysis, as shown in FIG. 17A (also see FIG. 25 for TGA and FTIR characterization). The incorporation of cross-linkable brushes with two different molecular weights can increase cross-linking density without deteriorating the brush-brush interpenetration. In addition, the probability of coupling between brushes of different chain lengths, i.e. 10 k*-10 k* brush, 10 k*-2.5 k* brush, or 2.5 k*-2.5 k* brush coupling, might result in the formation of a dual network between grafted nanoparticles, which could provide an additional toughening mechanism.[49]

The processability of the $ZrO_2$_1k_10k*_2.5k* matrix-free nanocomposite can be tuned by changing the cross-linking agent and catalyst concentration. Using the cross-linking agent tetrakis(dimethylsiloxy)silane and Pt catalyst as an example, the nanocomposite can flow freely at room temperature without the presence of catalyst (FIG. 17B), or can be cross-linked at room temperature (FIG. 17C, the gel point, or the crossover of the storage modulus G' and loss modulus G", is around 25° C.). The gel point can be increased such that the nanocomposite can be molded/shaped at room temperature and then cross-linked at higher temperatures (gel point is ~95° C. in FIG. 17D and FIG. 17E). The moduli can be tuned by adjusting SiH:Vinyl molar ratios. A significant decrease in storage modulus is obtained during cross-linking, probably due to secondary hydrolysis reactions of excessive SiH groups (FIG. 17E).[57] A detailed discussion of the cross-linking reaction is beyond the scope of this communication. Taking advantage of the multiple degrees of control over the polymer brush system, e.g. brush graft density, brush chain length and polydispersity, and core/brush volume fraction ratio, the overall properties of the cross-linked matrix-free $ZrO_2$/PDMS nanocomposites can be tailored.

Experimentals

LED Encapsulation

Figure 18:
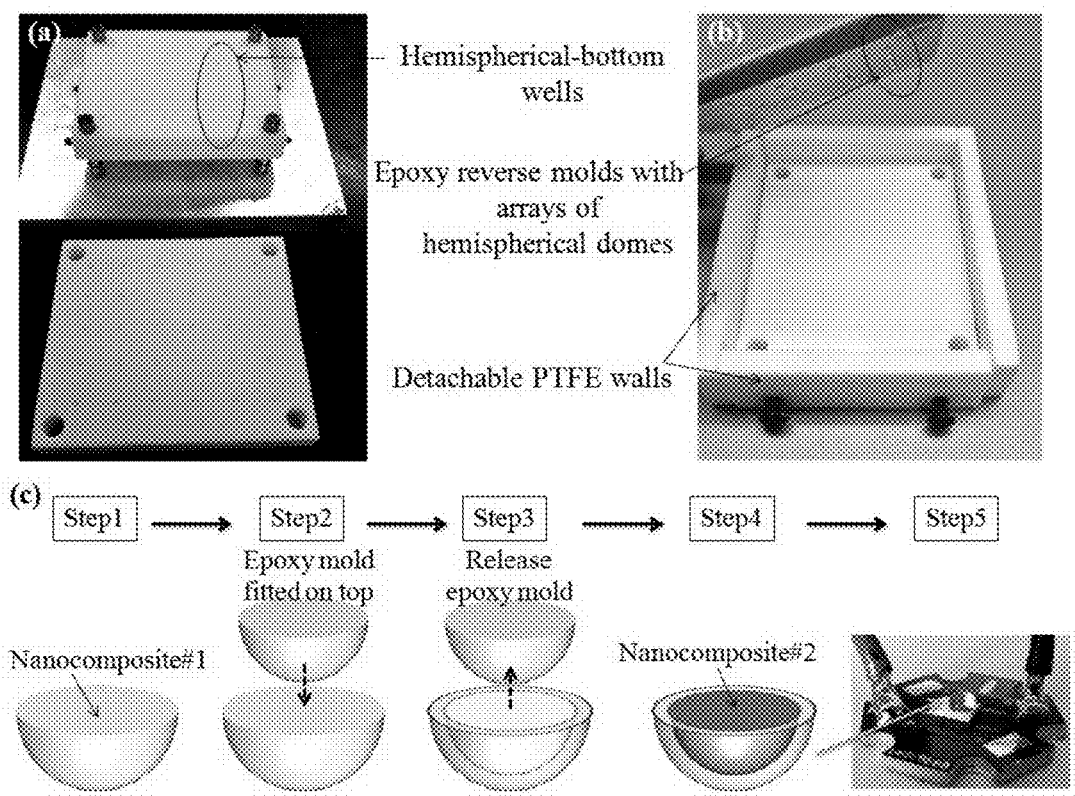
FIGS. 18A-18B are photographs of PTFE molds (FIG. 18A) and epoxy reverse mold (FIG. 18B).
FIG. 18C is an illustration of the fabrication process of a double-layer hemispherical LED encapsulate dome (Inset photograph of a LED mounted with the dome).

To apply the transparent high-refractive-index matrix-free $ZrO_2$/silicone nanocomposites for well-controlled LED encapsulation, two PTFE molds with arrays of spherical-bottom wells were made. For the uncrosslinked matrix-free nanocomposites, a double-layer hemi-spherical dome configuration was created, with the matrix-free nanocomposites being the inner layer and pure silicone being the outer layer. As shown in FIG. 18A, the diameters of the spherical-bottom wells of the two molds are equal to the diameters of the outer and inner layer of the doublelayer LED encapsulant dome, respectively. Installing detachable PTFE walls for the PTFE mold with a smaller well diameter can convert the mold into a container (FIG. 18B), which can be used to make an epoxy reverse mold with arrays of hemispherical domes. The fabrication process is described in FIG. 18C. First, the hemi-spherical wells of the PTFE mold were filled with uncured pure silicone. The epoxy reserve mold was then fitted on top of the PTFE mold concentrically during the cross-linking of the silicone resin. The epoxy mold was released after complete cure of the silicone in step 3. In the final step, the silicone "shell" was filled with the flowable matrix-free $ZrO_2$/silicone nanocomposite. The dome was then mounted on a LED with the flowable matrix-free $ZrO_2$/silicone nanocomposite filling in the reflector cup as an adhesive. A very thin layer of pure silicone resin was finally used to "paint" the outside wall of the mounted dome to ensure structural integrity. Since the high RI nanocomposite in the inner layer is directly in contact with the LED die, the double-layer encapsulant dome can increase the light extraction at the die/nanocomposite interface. Given the spherical geometry of the double-layer dome, the total internal reflection at the nanocomposite/silicone interface and the silicone/air interface is significantly alleviated.

Figure 19:
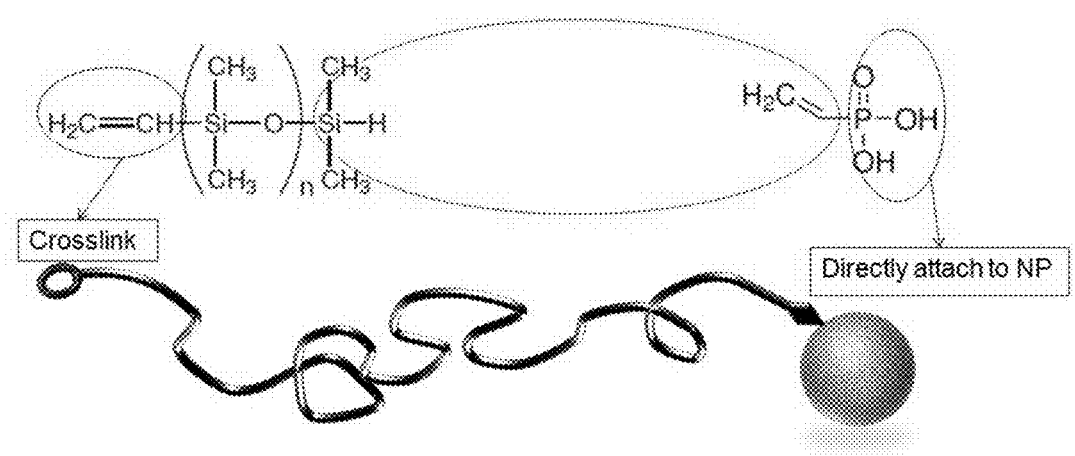
FIG. 19 is an illustration of the synthesis of a cross-linkable PDMS brush.

Synthesis of Cross-Linkable PDMS Brushes:

As shown in Scheme 3 (FIG. 19). The cross-linkable PDMS brushes were synthesized through a hydrosilylation reaction between α-monovinyl-ω-monohydride terminated PDMS (Gelest, DMS-HV15 with Mw=2,500 g/mol and DMS-HV22 with Mw=10,000 g/mol) and vinyl phosphonic acid (Sigma-Aldrich, VPA), which involves the addition of a silicon hydride (Si—H) bond across a carbon-carbon double bond in the presence of platinum complexes.[58, 59] In a typical reaction, 0.6 mmol of DMS-HV15 or DMS-HV22 was dissolved in 180 mL THF. Subsequently, 20 mL THF solution of platinum(0)-1,3-divinyl-1,1,3,3-tetramethyldisiloxane complex (Sigma-Aldrich) was added slowly under stirring, where the Pt concentration was designated to be 40 ppm.[60] 1.8 mmol of VPA was then added dropwise, and the mixture was refluxed at 70° C. for 24 hours. The modified PDMS in THF was precipitated using methanol and put in the centrifuge at 11,000 rpm for 10 min. The supernatant containing unreacted VPA and other byproducts was removed. The purified transparent cross-linkable PDMS brush polymers were put in a vacuum oven for 2 hours to remove any residual solvents.

Conclusions

"Matrix-free" nanocomposites with a bimodal population of polymer brushes are an excellent strategy to optimize filler loading while maintaining random dispersion. The surface bound polymer brushes not only provide structural integrity, but also stabilize filler dispersion. A multimodal brush configuration is important to ensure sufficient monomer crowding near the nanoparticle surface to screen the core-core attraction, meanwhile facilitating long brush entanglement and interpenetration at low brush volumes. Therefore, the most promising "matrix-free" nanocomposite should have at least one short brush population effectively filling nanofiller interstitial space and preventing microphase separation, and one long brush population with a molecular weight comparable to $M_e$ to ensure at least one "entanglement" per chain to suppress crack propagation. The current study demonstrates the use of "matrix-free" nanocomposites by incorporating more than 50 wt % $ZrO_2$ nanoparticle loading in PDMS without sacrificing optical transparency, leading to promising applications in high-refractive-index high-efficiency LED encapsulants.

References for Example 1, the Background, and the Summary

Below are citations to references cited by superscript numerals in Example 1, the Background of the Invention, and the Summary of the Invention. Citation of a reference herein shall not be construed as an admission that such reference is prior art to the present invention. The following references, to the extent that they provide exemplary procedural or other details supplementary to those set forth herein, are specifically incorporated herein by reference:

1. S. Kango, S. Kalia, A. Celli, J. Njuguna, Y. Habibi and R. Kumar, *Prog. Polym. Sc.*, 2013, 38, 1232-1261.
2. S. K. Kumar and R. Krishnamoorti, *Annu. Rev. Chem. Biomol. Eng.*, 2010, 1, 37-58.
3. J. Jancar, J. F. Douglas, F. W. Starr, S. K. Kumar, P. Cassagnau, A. J. Lesser, S. S. Sternstein and M. J. Buehler, *Polymer*, 2010, 51, 3321-3343.
4. B. M. Novak, *Adv. Mater.*, 1993, 5, 422-433.
5. F. W. Mont, J. K. Kim, M. F. Schubert, E. F. Schubert and R. W. Siegel, *J. Appl. Phys.*, 2008, 103, 1-6.
6. A. B. Bourlinos, S. Ray Chowdhury, R. Herrera, D. D. Jiang, Q. Zhang, L. A. Archer and E. P. Giannelis, *Adv. Funct. Mater.*, 2005, 15, 1285-1290.
7. A. B. Bourlinos, R. Herrera, N. Chalkias, D. D. Jiang, Q. Zhang, L. A. Archer and E. P. Giannelis, *Adv. Mater.*, 2005, 17, 234-237.
8. D. Kim, Y. Kim and J. Cho, *Chem. Mater.*, 2013, 25, 3834-3843.
9. Y. Zheng, J. Zhang, L. Lan, P. Yu, R. Rodriguez, R. Herrera, D. Wang and E. P. Giannelis, *Chem Phys Chem*, 2010, 11, 61-64.
10. S. Srivastava, J. L. Schaefer, Z. Yang, Z. Tu and L. A. Archer, *Adv. Mater.*, 2014, 26, 201-234.
11. M. N. Tchoul, S. P. Fillery, H. Koerner, L. F. Drummy, F. T. Oyerokun, P. A. Mirau, M. F. Durstock and R. A. Vaia, *Chem. Mater.*, 2010, 22, 1749-1759.
12. I. Yilgor, T. Eynur, E. Yilgor and G. L. Wilkes, *Polymer*, 2009, 50, 4432-4437.
13. J. Choi, C. M. Hui, J. Pietrasik, H. Dong, K. Matyjaszewski and M. R. Bockstaller, *Soft Matter*, 2012, 8, 4072-4082.
14. B. I. Dach, H. R. Rengifo, N. J. Turro and J. T. Koberstein, *Macromolecules*, 2010, 43, 6549-6552.
15. Y. Li, P. Tao, A. Viswanath, B. C. Benicewicz and L. S. Schadler, *Langmuir*, 2012, 29, 1211-1220.
16. P. Tao, A. Viswanath, Y. Li, R. W. Siegel, B. C. Benicewicz and L. S. Schadler, *Polymer*, 2013, 54, 1639-1646.
17. B. Natarajan, T. Neely, A. Rungta, B. C. Benicewicz and L. S. Schadler, *Macromolecules*, 2013, 46, 4909-4918.
18. H.-Y. Yu and D. L. Koch, *Langmuir*, 2010, 26, 16801-16811.
19. N. Dan and M. Tirrell, *Macromolecules*, 1993, 26, 6467-6473.
20. S. R. Edgecombe, J. M. Gardiner and M. W. Matsen, *Macromolecules*, 2002, 35, 6475-6477.
21. M. Wong, J. Guenther, L. Sun, J. BlUmel, R. Nishimura and H. J. Sue, *Adv. Funct. Mater.*, 2012, 22, 3614-3624.
22. R. Francis, N. Joy, E. Aparna and R. Vijayan, *Polymer Reviews*, 2014, 54, 268-347.
23. P. Tao, Y. Li, R. W. Siegel and L. S. Schadler, *J. Mater. Chem. C*, 2013, 1, 86-94.

24. Y. Li, T. M. Krentz, L. Wang, B. C. Benicewicz and L. S. Schadler, *ACS Appl. Mater. Interfaces*, 2014, 6, 6005-6021.
25. T. B. Martin and A. Jayaraman, *Macromolecules*, 2013, 46, 9144-9150.
26. G. Garnweitner, L. M. Goldenberg, O. V. Sakhno, M. Antonietti, M. Niederberger and J. Stumpe, *Small*, 2007, 3, 1626-1632.
27. C. Lü and B. Yang, *J. Mater. Chem.*, 2009, 19, 2884-2901.
28. U. Anselmi-Tamburini, J. N. Woolman and Z. A. Munir, *Adv. Funct. Mater.*, 2007, 17, 3267-3273.
29. M. A. White, J. A. Johnson, J. T. Koberstein and N. J. Turro, *J. Am. Chem. Soc.*, 2006, 128, 11356-11357.
30. B. Zhang, T. Kong, W. Xu, R. Su, Y. Gao and G. Cheng, *Langmuir*, 2010, 26, 4514-4522.
31. M. Kobayashi, R. Matsuno, H. Otsuka and A. Takahara, *Sci. Tech. Adv. Mater.*, 2006, 7, 617-628.
32. D. Dukes, Y. Li, S. Lewis, B. Benicewicz, L. Schadler and S. K. Kumar, *Macromolecules*, 2010, 43, 1564-1570.
33. T. Wu, K. Efimenko, P. Vlcek, V. Šubr and J. Genzer, *Macromolecules*, 2003, 36, 2448-2453.
34. Y. Wu, X. Zhao, F. Li and Z. Fan, *J. Electroceram.*, 2003, 11, 227-239.
35. T. Kyprianidou-Leodidou, W. Caseri and U. W. Suter, *J. Phys. Chem.*, 1994, 98, 8992-8997.
36. Y. Rao and S. Chen, *Macromolecules*, 2008, 41, 4838-4844.
37. M. M. Demir, K. Koynov, Ü. Akbey, C. Bubeck, I. Park, I. Lieberwirth and G. Wegner, *Macromolecules*, 2007, 40, 1089-1100.
38. W. Caseri, *Macromol. Rapid Commun.*, 2000, 21, 705-722.
39. W. Caseri, *Chem. Eng. Commun.*, 2008, 196, 549-572.
40. L. Filion and M. Dijkstra, *Phys. Rev. E*, 2009, 79, 046714.
41. H. Koerner, L. F. Drummy, B. Benicewicz, Y. Li and R. A. Vaia, *ACS Macro Lett.*, 2013, 2, 670-676.
42. H.-Y. Yu and D. L. Koch, *Langmuir*, 2013, 29, 8197-8202.
43. J. Choi, C. M. Hui, M. Schmitt, J. Pietrasik, S. Margel, K. Matyjazsewski and M. R. Bockstaller, *Langmuir*, 2013, 29, 6452-6459.
44. Y. Cheng, C. Lu and B. Yang, *Recent Pat. Mat. Sc.*, 2011, 4, 15-27.
45. L. Fetters, D. Lohse and R. Colby, in *Physical properties of polymers handbook*, Springer, 2007, pp. 447-454.
46. P. Longin, C. Verdier and M. Piau, *J. Non-newton. Fluid*, 1998, 76, 213-232.
47. Y. H. Zang and P. J. Carreau, *J. Appl. Polym. Sci.*, 1991, 42, 1965-1968.
48. T. C. McLeish and S. T. Milner, in *Branched Polymers II*, Springer, 1999, pp. 195-256.
49. R. A. Mrozek, P. J. Cole, K. J. Otim, K. R. Shull and J. L. Lenhart, *Polymer*, 2011, 52, 3422-3430.
50. C. Creton, E. J. Kramer and G. Hadziioannou, *Macromolecules*, 1991, 24, 1846-1853.
51. C.-A. Dai, E. J. Kramer, J. Washiyama and C.-Y. Hui, *Macromolecules*, 1996, 29, 7536-7543.
52. M. Ma, F. W. Mont, X. Yan, J. Cho, E. F. Schubert, G. B. Kim and C. Sone, *Opt. Express*, 2011, 19, A1135-A1140.
53. D. W. Chung and T. G. Kim, *J. Ind. Eng. Chem.*, 2007, 13, 979-984.
54. D. A. Brown and G. J. Price, *Polymer*, 2001, 42, 4767-4771.
55. L. Sacarescu, R. Ardeleanu, G. Sacarescu and M. Simionescu, *Eur. Polym. J.*, 2004, 40, 57-62.
56. J. R. Parikh and W. E. Doering, *J. Am. Chem. Soc.*, 1967, 89, 5505-5507.
57. T. Simpson, Z. Tabatabaian, C. Jeynes, B. Parbhoo and J. Keddie, *J. Polym. Sc., Part A: Polym. Chem.*, 2004, 42, 1421-1431.
58. W. Caseri and P. S. Pregosin, *Organometallics*, 1988, 7, 1373-1380.
59. L. N. Lewis, J. Stein, Y. Gao, R. E. Colborn and G. Hutchins, *Platinum Met. Rev.*, 1997, 41, 66-74.
60. D. W. Chung and T. G. Kim, *J. Ind. Eng. Chem.*, 2007, 13, 571-577.

Example 2

Supplemental Information: Bimodal Matrix-Free Polymer Nanocomposites $ZrO_2$ nanoparticle size distribution was characterized by measuring at least 200 particles using Image J. All the diffraction peaks in the XRD pattern of as-synthesized $ZrO_2$ nanoparticles (NPs) can be assigned on the basis of a cubic structure (JCPDS, 49-1642)[1], and the size of the nanocrystal was estimated to be 1.9 nm in radius.

The as-synthesized nanoparticle suspension in chloroform solution appears to be slightly cloudy due to the relatively weak stabilizing effect of benzyl alcohol, which acts as both solvent and stabilizing agent during the nanoparticle synthesis.[2] The chemisorbed benzyl alcohol can be readily replaced by the carboxyalkyl- and phosphate-terminated PDMS brushes, and monomodal, bimodal, and trimodal PDMS grafted nanoparticles, $ZrO_2\_1k$, $ZrO_2\_1k\_10k$, and $ZrO_2\_1k\_36k\_10k$, respectively, named according to the molecular weight of the brushes, were prepared via multiple-step "grafting-to" processes.

The successful attachment of the PDMS brushes was verified by FTIR spectra, as shown in FIG. 21A, which were normalized based on the Zr—O—Zr vibrational bands at 450-600 $cm^{-1}$.[3,4] For the as-synthesized nanoparticles, the FTIR peaks at 3028 $cm^{-1}$ (C—H stretching vibration of phenyl groups) and 700 $cm^{-1}$ (out-of-plane C—H vibration of phenyl groups) confirmed the presence of the surface-complexing benzoate species after synthesis.[2,5] The FTIR spectrum of $ZrO_2\_1k$ sample displays strong characteristic Si—O stretching vibrations at 1000-1100 $cm^{-1}$, as well as symmetric and asymmetric vibration of the carboxylate group at 1413 and 1558 $cm^{-1}$ respectively, indicating the chemical interaction between the 1 k carboxyalkyl-terminated PDMS brush and surface Zr centers.[5] The strong peaks from 2965 to 2847 $cm^{-1}$ can be attributed to the stretching vibrations of the $CH_2$ and $CH_3$ groups of the brush chain.[6] For the $ZrO_2\_1k\_36k\_10k$ sample, the phosphorus characteristic peaks cannot be distinguished probably because the absorption bands of P—O and P=O stretching (900-1300 $cm^{-1}$) were masked by vibration bands of Si—O and Si—$CH_3$ from the PDMS brushes.[6,7] The stretching band at 1728 $cm^{-1}$ in the $ZrO_2\_1k$ sample implies residual unbound carboxylic acid groups, which were washed away or replaced by phosphate-terminated PDMS brushes in the $ZrO_2\_1k\_36k\_10k$ sample.

The ligand exchange process agrees well with the TGA weight loss measurement, where the adsorbed hydroxyl and organic volatiles correspond to the weight loss stage at ~300° C., and chemically bound brushes are attributable to the second weight loss stage above 450° C. As shown in FIG. 21B, the core weight fractions of $ZrO_2\_1k$, ZrO$_2$_1k_10k, and ZrO$_2$_1k_36k_10k nanoparticles were also estimated as 79 wt %, 53 wt %, and 44 wt %, respectively. To give a quantitative description of grafted nanoparticle dimensions and architecture, the graft density of each PDMS brush was calculated first based on the corresponding weight loss ratio and the number of grafting chains (determined by TGA after each step of "grafting-to"), and surface area of nanoparticles using:[8]

$$\sigma=(wN_A/M_n)/(4\pi a^2 n)=a\rho z N_A \times 10^{-21}/3(1-z)M_n$$

where w, $N_A$, n, $\rho$, and z are the weight of polymers, Avogadro's number, the number of nanoparticles, density of nanoparticle cores, and weight loss of polymer chains, respectively. Both as-synthesized and grafted nanoparticles after each step of "grafting-to" were monitored by TGA measurements. To form a stronger P—O-M (M: Metal atom) bond, the 1 k carboxyalkyl-terminated PDMS brush grafted on the ZrO$_2$ nanoparticle surface can be replaced by the 36 k and 10 k phosphate-terminated PDMS in the sequential "grafting-to" reactions. To estimate the amount of removed 1 k brush, ZrO$_2$_1k nanoparticles were excessively washed using methanol and then subjected to TGA measurement, where ~3 wt % weight loss of 1 k brush was observed. The graft densities of each PDMS brush are calculated and listed in Table 2.

TABLE 2

Graft densities and core percentages of three types of PDMS-grafted ZrO$_2$ nanoparticles.

| Sample | $\sigma_{1k}$ (ch/nm$^2$) | $\sigma_{10k}$ (ch/nm$^2$) | $\sigma_{36k}$ (ch/nm$^2$) | Core percentage (%) |
|---|---|---|---|---|
| Monomodal ZrO$_2$ | 0.28 | — | — | 79 |
| Bimodal ZrO$_2$ | 0.20 | 0.10 | — | 53 |
| Trimodal ZrO$_2$ | 0.12 | 0.05 | 0.02 | 44 |

To determine the conformation of grafted PDMS chains, radius of gyration of PDMS polymer chains is calculated using[9] $R_g=\sqrt{0.077 \times N_{PDMS}}$(nm), and compared with the interchain spacing on the nanoparticle surface in Table 3. At low enough molecular weight or low enough graft density, $\sigma<1/R_g^2$, individual chains take mushroom-like conformations on the grafting surface with a thickness of radius of gyration.[10, 11] According to simulation studies, the addition of a longer brush population at a low graft density has little impact on the conformation of the inner brushes, and they behave similar to their monomodal counterparts.[12]

TABLE 3

Parameters used for estimating dimensions of PDMS-grafted nanoparticles.

| Polymer chains | N | $R_g$ (nm) | $1/R_g^2$ | $r/R_g$ |
|---|---|---|---|---|
| 1k PDMS | 14 | 1.02 | 0.96 | 1.9 |
| 10k PDMS | 135 | 3.23 | 0.10 | 0.59 |
| 36k PDMS | 486 | 6.12 | 0.03 | 0.31 |

Given the small radius ratio of "bare" nanoparticle and polymer brush coil (u=r/R$_g$<1), it is difficult for the 10 k and 36 k PDMS brushes to fit into the interstitial space between nanoparticles. On the other hand, from a packing point of view, the 1 k PDMS brush population fills the interstitial spacing more readily at its size ratio (u=1.9>($\sqrt{3-1}$)$^{-1}$).[13]

After careful solvent removal, the grafted nanoparticle assemblies remains highly transparent, indicating uniform dispersion and distribution of nanoparticle cores within the PDMS brush polymer, as shown in FIG. 21C.

In order to verify whether there is absorption of blue light in ZrO$_2$_1k_10k sample, we compare its experimental transmittance spectrum with a transmittance spectrum calculated from the Rayleigh scattering equation. As show in FIG. 23A, the transmittance spectrum should follow the prediction from the Rayleigh scattering equation assuming no absorption (dashed orange line).[6] However, there is transmittance discrepancy between the experimental data and the calculated curve starting from ~520 nm, which confirms the existence of blue absorption, leading to reduced light extraction enhancement of the blue LED. The absorption of blue light is probably due to the yellow-colored small organic components absorbed on the particle surfaces such as aromatic species, which could be produced during the high-temperature synthesis of the nanoparticles.[14] We attempted to quantitatively characterize the blue absorption by subtracting the integrated area below the experimental transmittance spectrum from that of the theoretical spectrum, and the transmittance discrepancy were plotted against wavelength (FIG. 23B). It was found that by repeating the washing procedure using methanol while backfilling the grafted nanoparticle with shorter brush to prevent aggregation, these yellow organic components were gradually replaced.

As shown in FIG. 25A, compared to the physically adsorbed hydroxyl and organic volatiles, 10 k* and 2.5 k* cross-linkable brushes bind strongly with ZrO$_2$ NPs through a M-O—P bond, and correspond to the weight loss stage at much higher temperatures. This result is consistent with previous observations for flowable "matrix-free" nanocomposites (ZrO$_2$_1k and ZrO$_2$_1k_36k_10k). The FTIR spectrum of ZrO$_2$_1k_10k*_2.5k* demonstrated the 3046 and 1640 cm$^{-1}$ peaks attributable to the C—H stretching and C=C stretching of the vinyl group.[5]

Instrumentations: The as-synthesized ZrO$_2$ nanoparticles were characterized by a PANalytical X'Pert Pro Diffractometer, solution Nuclear Magnetic Resonance (NMR, 500 MHz, CDCl$_3$), and a JEOL-2010 transmission electron microscope (TEM). Powder X-ray diffraction (XRD) patterns were recorded using Cu K$\alpha$ radiation ($\lambda$=0.154 nm at 40 mA and 45 kV) over the 2$\theta$range of 20 to 100° at a scan rate of 0.01°/min. The nanoparticle solution was dropped onto a carbon supported copper grid and dried in the hood overnight for TEM observation. The nanoparticle core fraction was determined by thermogravimetric analysis (TGA) using TA Instruments TGA-Q50. The grafted nanoparticles were characterized by a FT-IR Spectrophotometer (Perkin Elmer Spectrum One) scanning from 450 to 4000 cm$^{-1}$ with a resolution of 4 cm$^{-1}$ for 10 scans. Refractive index of neat silicone and nanocomposites was measured on a variable angle spectroscopic ellipsometer (VASE, J. A. Woollam Co., Inc., Lincoln, Nebr.) at three different incident angles (65, 70, and 75°). The samples were spin-coated on a Si wafer, and the measured results were fitted with the Cauchy model with a typical mean square error less than 5. The transmittance spectra of the sample-casted glass slides were measured with a Perkin-Elmer Lambda 950 UV/vis/NIR spectrophotometer. The spectral fluxes measurements of encapsulated LEDs were carried out in a 0.5 meter integrating sphere (Labsphere). The rheological experiments were carried out on a Rheometrics mechanical spectrometer (ARES cone & plate; TA Instruments®, USA) using a parallel-plate geometry (R=8 mm).

References for Example 2

Below are citations to references cited by superscript numerals in Example 2. Citation of a reference herein shall not be construed as an admission that such reference is prior art to the present invention. The following references, to the extent that they provide exemplary procedural or other details supplementary to those set forth herein, are specifically incorporated herein by reference:
1. R. Vacassy, C. Guizard, V. Thoraval and L. Cot, *J. Membr. Sci.,* 1997, 132, 109-118.
2. G. Garnweitner, L. M. Goldenberg, O. V. Sakhno, M. Antonietti, M. Niederberger and J. Stumpe, *Small,* 2007, 3, 1626-1632.
3. V. Bansal, D. Rautaray, A. Ahmad and M. Sastry, *J. Mater. Chem.,* 2004, 14, 3303-3305.
4. G. Lucovsky and G. Rayner, *Appl. Phys. Lett.,* 2000, 77, 2912-2914.
5. S. Zhou, G. Garnweitner, M. Niederberger and M. Antonietti, *Langmuir,* 2007, 23, 9178-9187.
6. P. Tao, Y. Li, R. W. Siegel and L. S. Schadler, *J. Appl. Polym. Sc.,* 2013, 130, 3785-3793.
7. P. Tao, Y. Li, A. Rungta, A. Viswanath, J. Gao, B. C. Benicewicz, R. W. Siegel and L. S. Schadler, *J. Mater. Chem.,* 2011, 21, 18623-18629.
8. M. Kobayashi, R. Matsuno, H. Otsuka and A. Takahara, *Sci. Tech. Adv. Mater.,* 2006, 7, 617-628.
9. C. K. Wu, K. L. Hultman, S. O'Brien and J. T. Koberstein, *J. Am. Chem. Soc.,* 2008, 130, 3516-3520.
10. D. Dukes, Y. Li, S. Lewis, B. Benicewicz, L. Schadler and S. K. Kumar, *Macromolecules,* 2010, 43, 1564-1570.
11. T. Wu, K. Efimenko, P. Vlcek, V. Šubr and J. Genzer, *Macromolecules,* 2003, 36, 2448-2453.
12. N. Nair, N. Wentzel and A. Jayaraman, *J. Chem. Phys.,* 2011, 134, 194906.
13. H. Brouwers, *Phys. Rev. E,* 2007, 76, 041304.
14. M. Niederberger and G. Garnweitner, *Chem. Eur. 1,* 2006, 12, 7282-7302.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A matrix-free polymer nanocomposite comprising:
    a plurality of polymer brush grafted nanoparticles forming a nanocomposite in the absence of a polymeric matrix, wherein the polymer brush comprises a multimodal brush configuration having at least two different populations of polymer ligands of different lengths grafted to a nanoparticle.

2. The matrix-free polymer nanocomposite according to claim 1, wherein the nanoparticles have a diameter of less than 20 nanometers.

3. The matrix-free polymer nanocomposite according to claim 1, wherein the nanoparticles are present at a loading fraction selected from the group consisting of at least 10 wt %.

4. The matrix-free polymer nanocomposite according to claim 1, wherein the nanocomposite is an optically transparent nanocomposite with a thickness of between about 0.1-10 millimeters (mm) and an optical transparency selected from the group consisting of at least 50%.

5. The matrix-free polymer nanocomposite according to claim 1, wherein the nanoparticles comprise high refractive index inorganic materials.

6. The matrix-free polymer nanocomposite according to claim 1, wherein the nanoparticles comprise inorganic materials selected from the group consisting of zirconia ($ZrO_2$), titania ($TiO_2$), indium tin oxide (ITO), barium titanate ($BaTiO_3$), zinc oxide (ZnO), zinc sulfide (ZnS), cerium oxide ($CeO_2$), bismuth titanate ($Bi_4Ti_3O_{12}$), hafnium oxide ($HfO_2$), magnesium oxide (MgO), manganese dioxide ($MnO_2$), silica ($SiO_2$), alumina ($Al_2O_3$), cadmium selenide (CdSe), copper oxide (CuO), silver oxide (AgO), and mixtures thereof.

7. The matrix-free polymer nanocomposite according to claim 1, wherein the two different polymer ligands comprise a first polymer ligand and a second polymer ligand, where the first polymer ligand is longer than the second polymer ligand.

8. The matrix-free polymer nanocomposite according to claim 7, wherein the first polymer ligand is grafted to the nanoparticle at a relatively low density and the second polymer ligand is grafted to the nanoparticle at a relatively higher density.

9. The matrix-free polymer nanocomposite according to claim 8, wherein the relatively low density of the first polymer ligand ranges from about 0.01 to about 0.10 ligand chain per square nanometer ($nm^2$), and wherein the relatively higher density of the second polymer ligand ranges from about 0.05 to about 1.0 ligand chain per square nanometer ($nm^2$).

10. The matrix-free polymer nanocomposite according to claim 1, wherein the polymer is selected from the group consisting of polydimethylsiloxane (PDMS), poly(glycidyl methacrylate) (PGMA), poly stearyl methacrylate (PSMA), epoxy, polypropylene, silicone, polyethylene, polyamide, polyimide, polyethyleneterephthalate, polyetherimide, polymethylmethacrylate, polystyrene, polyacrylate, and derivatives thereof.

11. The matrix-free polymer nanocomposite according to claim 1, wherein the nanocomposite is in a solid state form.

12. The matrix-free polymer nanocomposite according to claim 1, wherein the nanocomposite is a thermoplastic nanocomposite, an elastomer nanocomposite, or a thermoset nanocomposite.

13. The matrix-free polymer nanocomposite according to claim 1, wherein the nanocomposite is cross-linkable.

14. The matrix-free polymer nanocomposite according to claim 1, wherein the polymer brush is trimodal.

15. The matrix-free polymer nanocomposite according to claim 1, wherein the polymer ligands have a first end, a second end, and a backbone, wherein said first end comprises a group selected from the group consisting of carboxyalkyl and phosphate.

16. The matrix-free polymer nanocomposite according to claim 15, wherein the polymer ligands further comprise:
    a cross-linkable moiety at the second end, as a pendant group, or on the backbone of the polymer ligand.

17. The matrix-free polymer nanocomposite according to claim 15, wherein the polymer ligand is a fluorescent ligand, a cationic polymer ligand, or a ligand leading to a polyelectrolyte or charged polymer.

18. An optic or optoelectronic component comprising a matrix-free polymer nanocomposite according to claim 1.

19. The optic or optoelectronic component according to claim 18, wherein the matrix-free polymer nanocomposite is part of an apparatus selected from the group consisting of a light-emitting diode (LED), a secondary optic that mixes light, a secondary optic that bends light, a visible light communications component, a laser diode, a laser diode array, an optical fiber, an optical waveguide, an optical sensor, an imaging system, a contact lens, an ocular implant, an image display system, an optical lithography system, an optical microscopy system, and an optical-micro-electromechanical system (MEMS) (also referred to as a micro-opto-electro-mechanical system (MOEMS)).

20. A method of making a matrix-free polymer nanocomposite, said method comprising the steps of:
   providing a plurality of nanoparticles of a same chemical nature; and
   grafting a multimodal polymer brush onto the plurality of nanoparticles to yield a plurality of polymer brush grafted nanoparticles forming a nanocomposite in the absence of a polymeric matrix,
   wherein the multimodal polymer brush comprises at least a first polymer ligand and a second polymer ligand of differing lengths grafted to a nanoparticle, and
   cross-linking nanoparticles.

* * * * *